US012540066B2

(12) United States Patent
Sergyeyenko et al.

(10) Patent No.: US 12,540,066 B2
(45) Date of Patent: Feb. 3, 2026

(54) AUTOMATED DRINK MAKER

(71) Applicant: Black & Decker, Inc., New Britain, CT (US)

(72) Inventors: Oleksiy P. Sergyeyenko, Baldwin, MD (US); Andrew Cross, Bel Air, MD (US); Thomas Landis, Baltimore, MD (US); Randy L. Rhoades, Seward, PA (US); Graham Bone, Durham (GB); Daniel Langford, Baltimore, MD (US); Mark Thomas Davies, Newcastle (GB); Michael C. Doyle, Baldwin, MD (US); Aldon O. Blackwood, Baltimore, MD (US); Tylan A. Tschopp, Baltimore, MD (US)

(73) Assignee: Black & Decker, Inc., New Britain, CT (US)

( * ) Notice: Subject to any disclaimer, the term of this patent is extended or adjusted under 35 U.S.C. 154(b) by 0 days.

(21) Appl. No.: 18/448,320

(22) Filed: Aug. 11, 2023

(65) Prior Publication Data

US 2023/0382708 A1 Nov. 30, 2023

Related U.S. Application Data

(63) Continuation of application No. 17/715,162, filed on Apr. 7, 2022, now Pat. No. 11,820,638.

(60) Provisional application No. 63/184,495, filed on May 5, 2021.

(51) Int. Cl.
*B67D 1/08* (2006.01)
*B67D 1/00* (2006.01)

(52) U.S. Cl.
CPC ............ *B67D 1/08* (2013.01); *B67D 1/0021* (2013.01); *B67D 1/0891* (2013.01); *B67D 2001/082* (2013.01); *B67D 2210/00062* (2013.01)

(58) Field of Classification Search
CPC ...... B67D 1/08; B67D 1/0021; B67D 1/0891; B67D 2001/082; B67D 2210/00062; B67D 1/0037; B67D 1/0078; B67D 1/07; B67D 2210/00028; B67D 1/0888; B67D 1/1206; B67D 1/0842; B67D 1/0875; B67D 1/16; B67D 1/0042; B67D 1/06; B67D 1/0802; B67D 1/1247; B67D 1/0041
See application file for complete search history.

(56) References Cited

U.S. PATENT DOCUMENTS

| | | | | |
|---|---|---|---|---|
| 10,064,513 B2 | 9/2018 | Rehfuss | | |
| 11,655,134 B1 * | 5/2023 | Perkins | B67D 1/0003 | 222/129.1 |
| 2006/0021372 A1 * | 2/2006 | Wolski | F25D 15/00 | 62/389 |

(Continued)

FOREIGN PATENT DOCUMENTS

| | | |
|---|---|---|
| CN | 206857033 U | 1/2018 |
| DE | 202005003266 U1 | 6/2005 |

(Continued)

*Primary Examiner* — Donnell A Long
(74) *Attorney, Agent, or Firm* — Morrison & Foerster LLP

(57) ABSTRACT

A drink making device including a hood, a base configured to support at least four bottles, a tower connecting the base and the hood; and a dispenser for dispensing a beverage. The hood includes at least four attachment connectors. Liquid from the bottles is selectively pumped through the connectors through the dispenser to dispense a beverage.

16 Claims, 40 Drawing Sheets

(56) References Cited

U.S. PATENT DOCUMENTS

| | | | | |
|---|---|---|---|---|
| 2008/0277422 | A1* | 11/2008 | Sommerfield | B67D 1/0412 222/399 |
| 2009/0218365 | A1* | 9/2009 | Taradalsky | B67D 3/0054 222/400.7 |
| 2010/0005811 | A1* | 1/2010 | Jaffe | B67D 1/0869 222/386 |
| 2010/0145522 | A1* | 6/2010 | Claesson | A47J 43/07 700/285 |
| 2011/0000250 | A1* | 1/2011 | Sommerfield | F25D 31/007 222/394 |
| 2011/0073212 | A1* | 3/2011 | Erbs | G01G 19/30 141/83 |
| 2011/0139828 | A1* | 6/2011 | Sommerfield | B67D 1/0406 222/399 |
| 2011/0168738 | A1* | 7/2011 | Nevarez | B67D 1/0052 222/144.5 |
| 2011/0253746 | A1* | 10/2011 | O'Keefe, Jr. | B67D 1/0005 222/173 |
| 2012/0103197 | A1* | 5/2012 | Chase | B67D 1/0889 99/280 |
| 2012/0318822 | A1* | 12/2012 | Strauss | B67D 1/0406 222/608 |
| 2014/0182715 | A1* | 7/2014 | Cooper | B67D 1/0081 137/511 |
| 2014/0272019 | A1* | 9/2014 | Schuh | A47J 31/401 426/115 |
| 2014/0299630 | A1* | 10/2014 | Brown | B67D 1/06 222/144.5 |
| 2014/0374444 | A1* | 12/2014 | Forte | B67D 1/0004 222/144.5 |
| 2015/0344284 | A1* | 12/2015 | Perkins | B67D 1/0036 222/1 |
| 2016/0023880 | A1* | 1/2016 | Forte | B67D 1/10 134/22.18 |
| 2016/0280527 | A1* | 9/2016 | Griscik | B67D 1/0872 |
| 2016/0297666 | A1* | 10/2016 | Guy | B67D 1/0443 |
| 2018/0111173 | A1* | 4/2018 | Bertness | B08B 9/0325 |
| 2018/0111813 | A1* | 4/2018 | Bencista' Falorni | B67D 1/0842 |
| 2019/0059636 | A1* | 2/2019 | Fedorak | A47J 31/5255 |
| 2019/0276297 | A1* | 9/2019 | Tewari | B67D 3/0061 |
| 2020/0096947 | A1 | 3/2020 | Thomas et al. | |
| 2021/0276852 | A1* | 9/2021 | Kim | B67D 1/07 |
| 2022/0024748 | A1* | 1/2022 | Fantappie | B67D 1/0078 |

FOREIGN PATENT DOCUMENTS

| | | | |
|---|---|---|---|
| DE | 202006009744 | U1 | 12/2006 |
| DE | 202012002184 | U1 | 12/2012 |
| EP | 1295844 | A1 | 3/2003 |
| EP | 3097827 | B1 | 4/2020 |
| IT | 20120117 | | 12/2013 |
| KR | 200472814 | Y1 | 5/2014 |
| WO | 2013079814 | A1 | 6/2013 |
| WO | 2016132005 | A1 | 8/2016 |
| WO | 2018074355 | A1 | 4/2018 |
| WO | 2018112581 | A1 | 6/2018 |
| WO | WO-2020092859 | A1 * | 5/2020 |

* cited by examiner

AUTOMATED DRINK MAKER

CROSS-REFERENCE TO RELATED APPLICATIONS

This application is a continuation of and claims priority to U.S. Non-Provisional application Ser. No. 17/715,162, filed on Apr. 7, 2022, titled, "AUTOMATED DRINK MAKER," which claims the benefit of U.S. Provisional Application No. 63/184,495, filed on May 5, 2021, titled, "AUTOMATED DRINK MAKER," both of which are incorporated herein by reference in its entirety.

FIELD OF THE INVENTION

The present invention relates to a drink making device.

BACKGROUND

There are various existing drink making devices. It is desired to provide a drink making device with improved features.

SUMMARY

According to an exemplary embodiment, there is a drink making device, comprising: a hood; a base configured to support at least four bottles; a tower connecting the base and the hood; and a dispenser for dispensing a beverage; wherein the hood includes at least four attachment connectors; and wherein liquid from the bottles is selectively pumped through the connectors through the dispenser to dispense a beverage.

The base and attachment connectors may be configured to receive bottles of different sizes.

There may be a pump to selectively draw liquids out of the bottles.

The hood may be substantially rectangular shaped.

The base may be substantially rectangular shaped.

The base may include at least one LED for illuminating at least one bottle.

The drink maker may further include a controller for controlling operation of the drink maker.

The drink maker may be powered by a battery pack or through a wall outlet.

The tower may include a compartment for receiving the battery pack.

The maker may also include a flavor capsule.

Liquid from at least one of the bottles may be mixed with contents of the flavor capsule to create a beverage.

The hood may be substantially square-shaped and the base is substantially square-shaped.

According to another aspect there is a drink making device, comprising: a base configured to support a bottle containing a liquid; a hood; a tower connecting the base and the hood; a dispenser for dispensing a beverage; a connector disposed in the hood and configured to receive liquid from the bottle; a rigid connector that extends into the bottle and engages with the connector.

The connector may be rotatable from an open position and a closed position.

The connector may be configured such that it can receive different lengths of the rigid connector to operatively connect the bottle to the hood.

The drink making device may include a bottle sealing grommet which seals the bottle. The rigid tube may project into the bottle sealing grommet.

According to another aspect, there is an exemplary embodiment of a drink making device including a base configured to support a bottle containing a liquid; a hood; a tower connecting the base and the hood; a dispenser for dispensing a beverage; a connector disposed in the hood and configured to receive liquid from the bottle; a rigid tube projecting into the bottle; a nozzle connected to an end of the rigid tube; and a coupler disposed in the hood and configured to receive the nozzle.

The drink making device may also include a cap disposed in the hood.

The cap may be rotatable between an open position and a closed position.

When the cap is in the open position, the nozzle may be inserted into the coupler.

When the cap is in the closed position, the nozzle is secured to the coupler.

The drink making device may further include a liquid detector to determine if there is liquid in the bottle.

The drink maker may further include a pump for drawing liquid out of the bottle.

The liquid detector may include a current sensor.

The liquid detector may include a flow sensor.

According to another aspect, there is a drink making device, comprising: a base configured to support a bottle containing a liquid; a hood; a tower connecting the base and the hood; a dispenser for dispensing a beverage; a connector disposed in the hood and configured to receive liquid from the bottle; a rigid tube projecting into the bottle; a nozzle connected to an end of the rigid tube; a sealing member disposed in the hood and selectively connectable to the nozzle to engage the bottle into the drink making device.

The drink making device may further include a lever.

The sealing member may be operatively engaged with the lever.

The sealing member may be movable from an open position in which the nozzle can be inserted into the hood and a closed position in which the sealing member engages the nozzle.

The sealing member may be biased toward the closed position.

The lever may move with the sealing member.

DETAILED DESCRIPTION OF EXEMPLARY EMBODIMENTS

Figure 1:
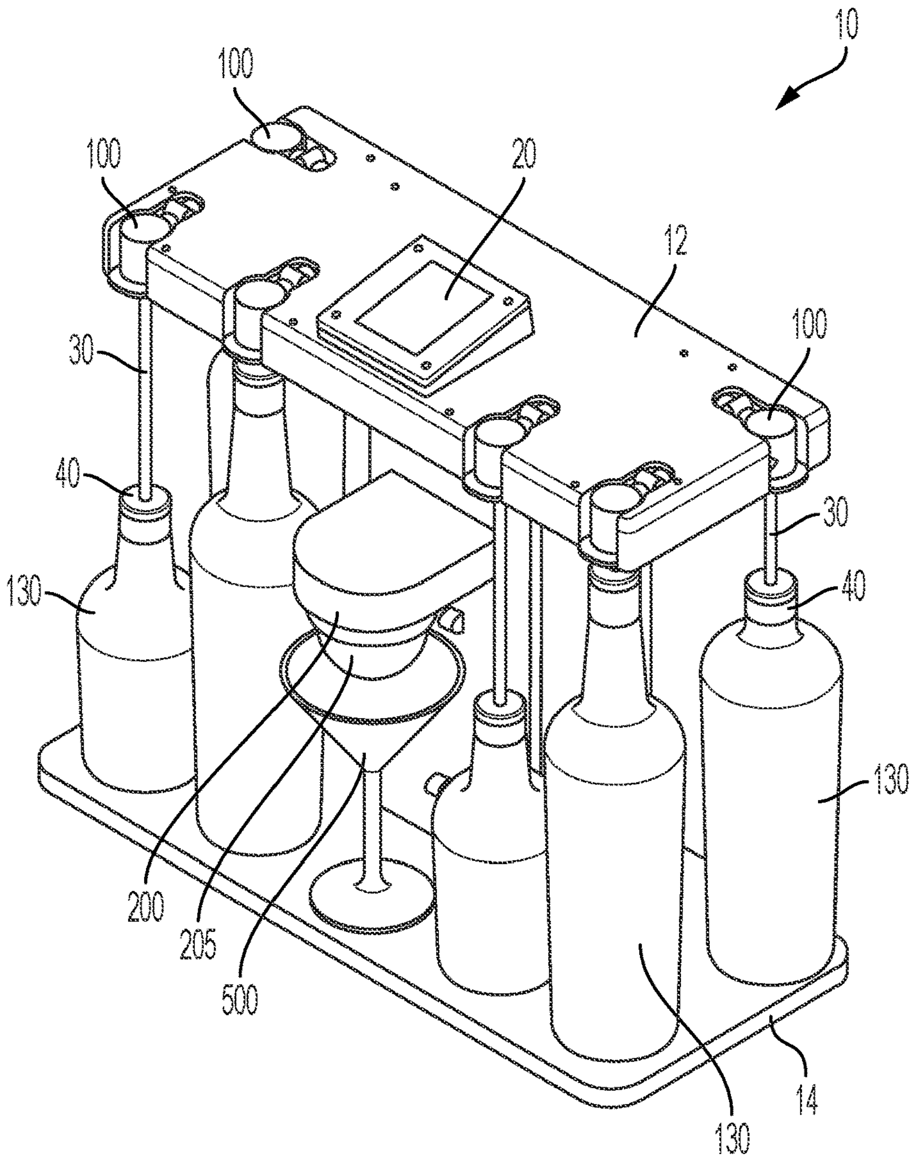
FIG. 1 illustrates a perspective view of a drink maker according to an exemplary embodiment.

The present application relates to a device for making drinks. FIGS. 1-15 illustrate a first non-limiting, exemplary embodiment of a drink maker 10. The drink maker 10 is shown in a perspective view in FIG. 1 and a front view in FIG. 3. A flavor pod capsule 150 is illustrated in a perspective view in FIG. 2.

The drink maker 10 of the exemplary embodiments is capable of using standard, off-the-shelf liquor bottles 130 and the flavor pod capsule 150 to produce a mixed cocktail. In the exemplary embodiment, the drink maker 10 is designed to receive bottles of gin, vodka, rum, tequila, whiskey and water. In other embodiments, there may be more or fewer bottles and the drink maker 10 may be configured to receive different alcoholic or non-alcoholic liquids. The drink maker 10 is configured to draw appropriate amounts of liquids from the various bottles 130. The liquids and flavoring from the capsule 150 are dispensed into a glass 500 to form a finished cocktail. The touchscreen 20 allows a user to operate the machine. This may include turning the machine on and off, starting the process of making a drink, choosing a drink strength or size or performing another operation. In the exemplary embodiment, the capsule 150 includes a barcode that is scanned by a barcode reader on the drink maker 10. The drink maker 10 provides the appropriate liquids for the cocktail based on the read barcode.

Figure 2:
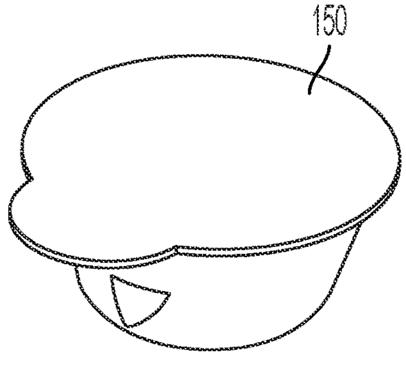
FIG. 2 illustrates a flavor pod according to an exemplary embodiment.
Figure 3:
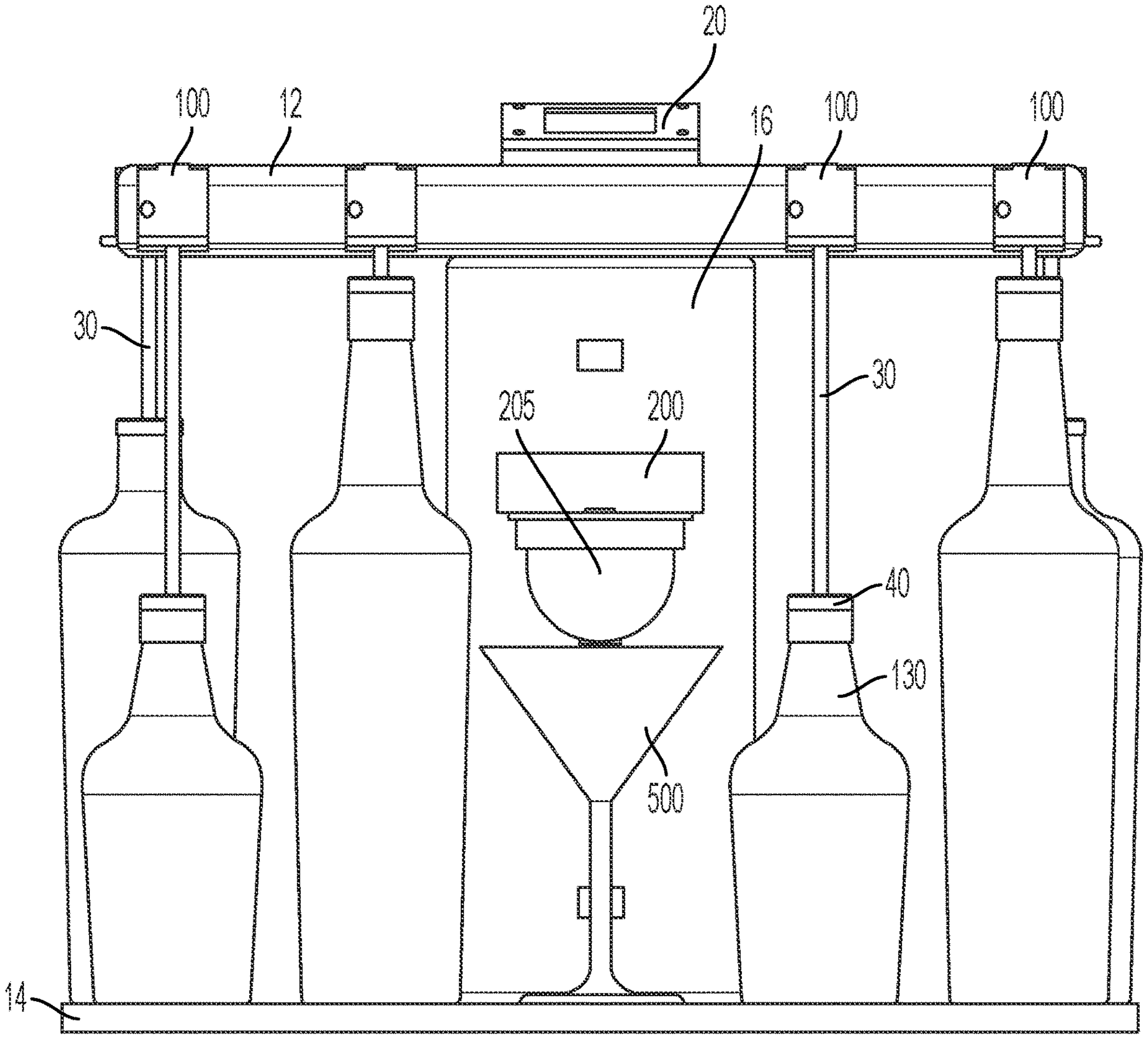
FIG. 3 is a front view of the drink maker according to the exemplary embodiment.

As shown in FIGS. 1 and 3, the drink maker 10 includes a hood 12. The hood 12 serves as a housing for various components of the drink maker 10, such as valves, hoses, a printed circuit board and a controller, such as a microprocessor. The touch screen 20 is disposed on the hood 12. In other embodiments, different input devices may be utilized instead of a touch screen. The hood 12 also includes a bottle attachment cap 100 which help facilitate attachments of the bottles 130 to the drink maker 10. The bottles 130 sit on a base 14. Light emitting diodes (LEDs) may be housed in the base 14 to illuminate the bottles 130. There may be an LED or plurality of LEDs placed under each bottle 130 or the LEDs may be spread around the entire base 14. The base 14 may include one or more transparent or translucent portions to allow light from the LEDs to project through the base 14.

A tower 16 connects the base 14 and the hood 12. The tower 16 may include various components as shown and described in further detail below.

As shown in FIGS. 1 and 3, the bottles are attached to the hood 12 of the drink maker 10 through a rigid tube 30. The rigid tube 30 of the exemplary embodiment is made of metal, such as stainless steel or aluminum. In other embodiments, the rigid tube 30 may be made of other materials. A bottle sealing grommet 40 connects with the bottles 130. The rigid tube 30 extends through the grommet 40 into the bottles and up to the attachment caps 100. Liquid from the bottles 130 flow through the rigid tubes 30 to provide liquid to the dispenser 200. The connection system will be described in more detail below with respect to FIGS. 7-14.

Figure 4:
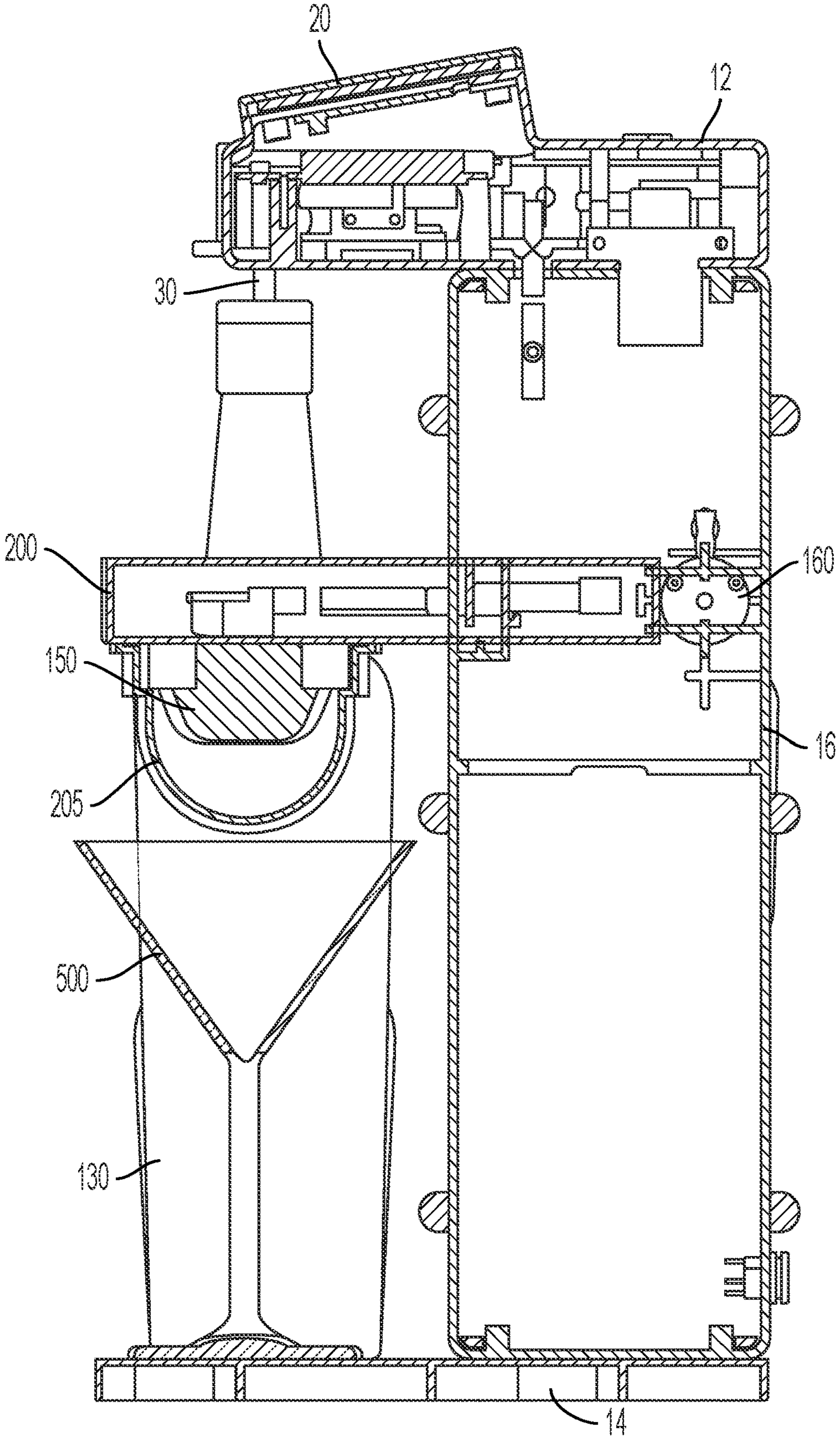
FIG. 4 is a cut-away side view of the drink maker according to the exemplary embodiment.
Figure 5:
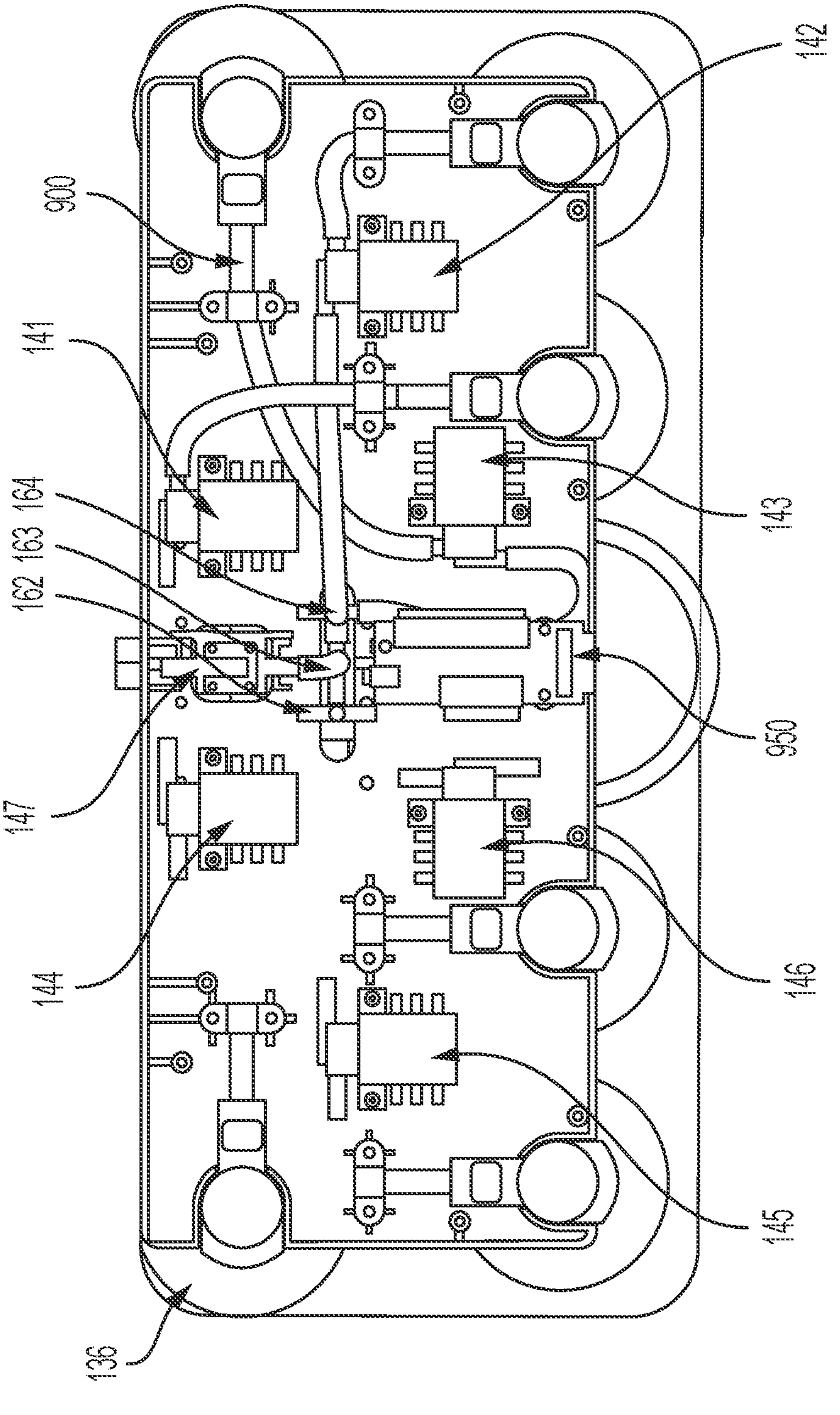
FIG. 5 is a cut-away top view of the drink maker according to the exemplary embodiment.
Figure 6:
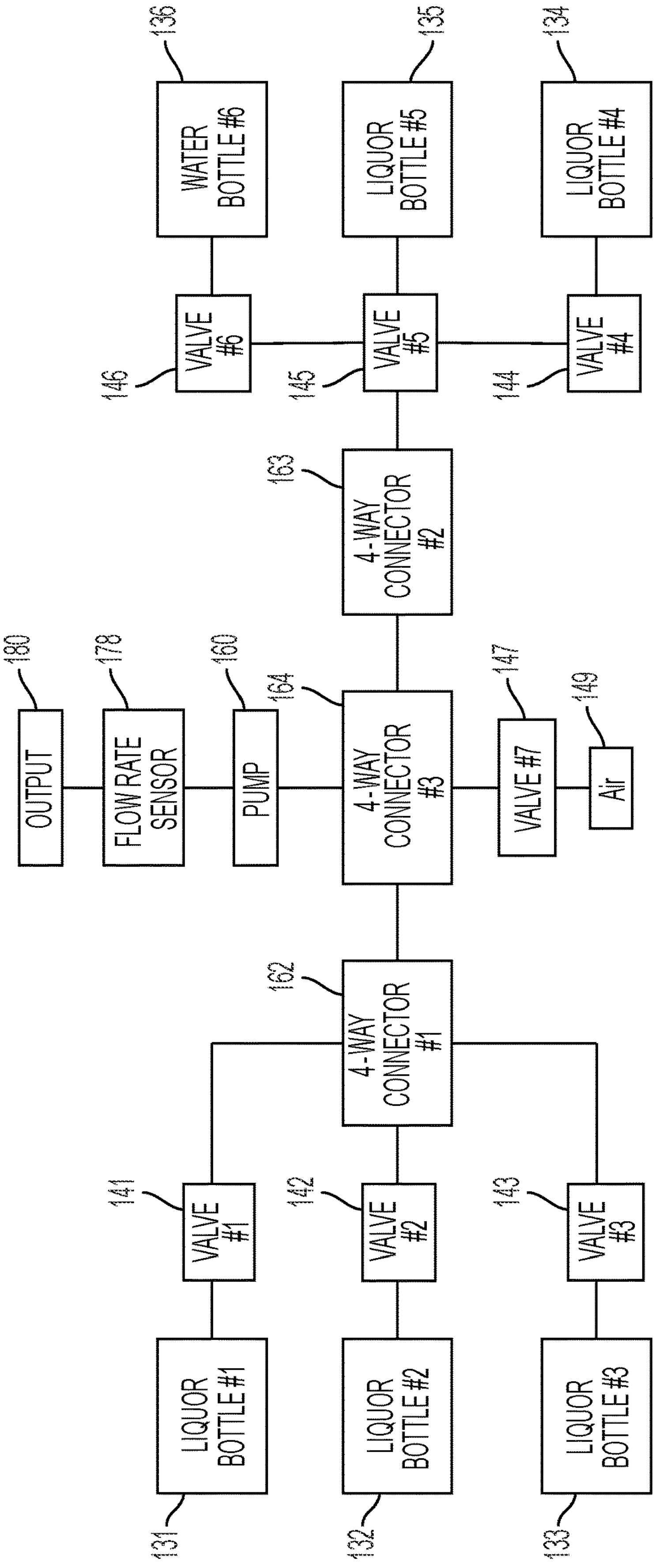
FIG. 6 is a schematic illustration of drink maker components.

Basic operation of the drink maker 10 will be described with reference to FIGS. 4-7. FIG. 4 is a cross-sectional side view of the drink maker 10. The side view of FIG. 4 helps to illustrate internals of the tower 16, hood 12 and dispenser 200. FIG. 5 is a cross-sectional top view that illustrates internal components housed in the hood 12. FIG. 6 is a schematic illustration of drink maker components.

As shown in FIG. 6, there are six bottles 130. Five of the bottles 130 are liquor bottles 131, 132, 133, 134 and 135. A sixth bottle 130 is a water bottle containing water. In the exemplary embodiment of the drink maker 10, the drink maker 10 is configured to operate with particular liquors disposed in specific bottles 130. For example, the first liquor bottle 131 may be designated to contain rum. A user may place a bottle of rum at the location for the first liquor bottle 131. The drink maker 10 assumes that the first liquor bottle 131 correctly contains rum and draws liquid from the first liquor bottle 131 when a drink calls for rum. Similarly, the second liquor bottle 132 may be designated as a bottle of vodka and the drink maker 10 may draw from the second liquor bottle 132 when vodka is called for in a particular drink. In other embodiments, the drink maker 10 may be programmable so that a user may enter the type of liquor in each position. For example, a user may be able to input through the touch screen 20 the type of liquor in each bottle 130 and the drink maker may operate accordingly.

As shown in FIGS. 5 and 6, there are valves 140 (141, 142, 143, 144, 145, 146) for each of the bottles 130 (131-136). The valves 140 may be opened to allow liquid from the bottles 130 to flow out of the bottles. When closed, the valves 140 prevent the flow of air or liquid to or from the particular bottles 130. As further shown in FIGS. 5 and 6, there is an air valve 147 to control a supply of air 149. The air 149 may be ambient air, a fan, an air pump or a supply of compressed air. The air 149 may be used to clear and dry out any hoses, valves, connectors and other components. As shown in FIGS. 4 and 6, there is additionally a pump 160, a flow rate sensor 170 and an output 180. The output 180 outputs liquids from the bottles 130 through the capsule 150 and out of the dispenser 200.

In order to operate the drink maker 10, a user inserts a capsule 150 into the dispenser 200. The dispenser 200 may open to receive the capsule 150 and then close. The dispenser 200 may include a projection that pierces the capsule 150.

The drink maker 10 includes a bar code reader and the capsule 150 includes a bar code. The bar code on the capsule 150 provides information about the capsule 150 so that an appropriate drink is made. The capsule 150 itself includes flavoring. The flavoring may be liquid, powder, gel other flavorings or a combination of the same. The controller in the drink maker 10 operates the pump 160 and valves 140 to provide an appropriate drink to the glass 500. The flow rate sensor 170 measures the amount of the liquids.

For example, the first liquor bottle 131 may include rum and the second liquor bottle 132 may include whiskey. The capsule 150 may include a flavoring for a drink that is intended to include four ounces of rum and four ounces of whiskey at normal strength. The bar code reader in the drink maker 10 reads the bar code on the capsule 150 determines the type of capsule 150. As discussed above, the drink maker 10 may also allow a user to input preferences for the particular drink, such as a strength, size or other preference or modification. The drink maker 10 takes the information from the capsule 150 and produces an appropriate drink. In particular, the controller of the drink maker 10 controls the valves 140 and pump 160 to create the appropriate drink.

In the present example of a normal strength drink requiring 4 ounces of rum and four ounces of whiskey, the controller turns on the pump 160 and opens the first valve 141. The pump 160 draws rum from the first liquor bottle 131, through the first valve 141, through the first four-way connector 162, through the third four-way connector 164 and through the output 180. The flow rate sensor 170 measures the amount of rum so that approximately four ounces is delivered through the output 180. When an appropriate amount of rum is provided, the first valve 141 is closed and the pump 160 may be turned off. While the first valve 141 is open, the other valves 140 are closed. In particular, the second, third, fourth, fifth, sixth and seventh valves 142-147 are closed. This ensures that only liquid from the first liquor bottle 131 is drawn by the pump 160

Information from the flow rate sensor 170 may be used by the controller in various ways. For example, the controller may control the pump 160 primarily through the measurement of time and the flow rate sensor 170 may be used as a confirmation. As an example, the pump 160 may be designed to draw one ounce of liquid each second. In order to provide four ounces of liquid, the pump 160 may be operated for four second. The flow rate sensor 170 could be used to monitor the amount of liquid being drawn to confirm that the designed rate is accurate. In that instance, the controller could check that one second of pump 160 operation draws one ounce of liquid.

In some instances, the flow rate sensor 170 could be used to modify the timing of the pump 160. For example, the pump 160 could be originally designed to draw one ounce of liquid per second, but over time, the pump 160 could begin to draw less liquid, such as one ounce of liquid every one and a half seconds. In that instance, the controller could modify operation of the pump 160 to account for the difference.

In some embodiments, the flow rate sensor 170 may be the primary or only factor for determining the amount of liquid delivered. In that instance, the controller may close the first valve 141 after the flow rate sensor 170 determines an appropriate amount of liquid has been drawn from the first bottle 131. The controller may close the first valve 141 before the flow rate sensor 170 measures the full amount of liquid in order to account for factors such as the amount of liquid in tubes. For example, the controller may close the first valve 141 when the flow rate sensor 170 measures three ounces of liquid so as to deliver a full four ounces of liquid when the remaining liquid flows through the connectors and any tubing. The pump 160 may continue to operate after the first valve 141 is closed. Another valve may open, such as the seventh valve 147 may open to draw air 149 through.

After a sufficient amount of rum from the first bottle 131 is output through the output 180 as discussed above, a similar operation may take place for the whiskey in the second bottle 132. In other drinks, other liquids may be drawn in a similar manner. The seventh valve 147 may be used to draw air 149 to drive any remaining liquid through the system and dry or clean out the system.

The drink may be mixed in the capsule 150, the dispenser 200, the glass 500 or a combination of the above.

FIGS. 7-14 illustrate attachment of the bottles 130 into the drink maker 10. A user of the drink maker 10 attaches the six bottles 130 to the drink maker 10. As discussed above, in the exemplary embodiment, five of the bottles 130 contain liquor and a sixth bottle 130 contains water. In other embodiments, other liquids may be included. For example, four bottles may include liquor, one include a juice or non-alcoholic mixer and one contain water. Other combinations are possible.

Figure 9:
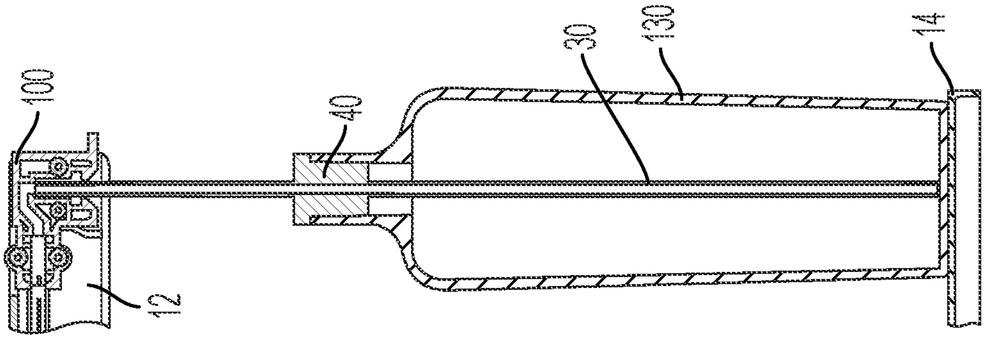
FIG. 9 illustrates a side view of a bottle during an attachment procedure.
Figure 8:
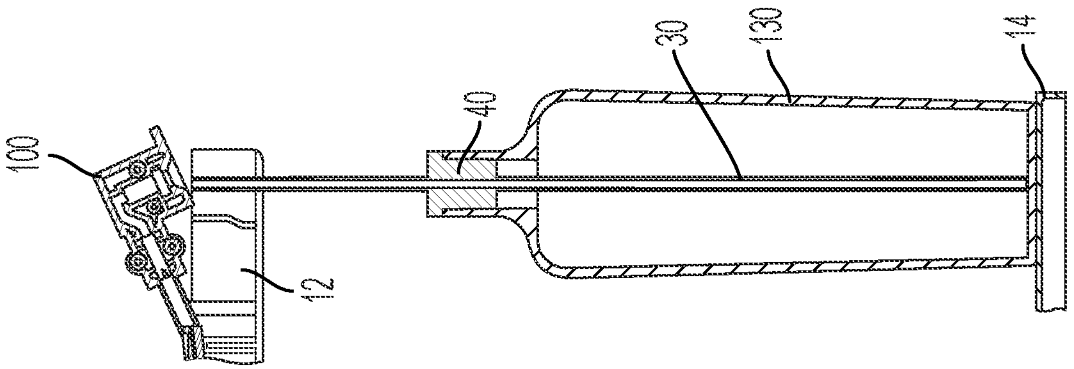
FIG. 8 illustrates a side view of a bottle during an attachment procedure.
Figure 7:
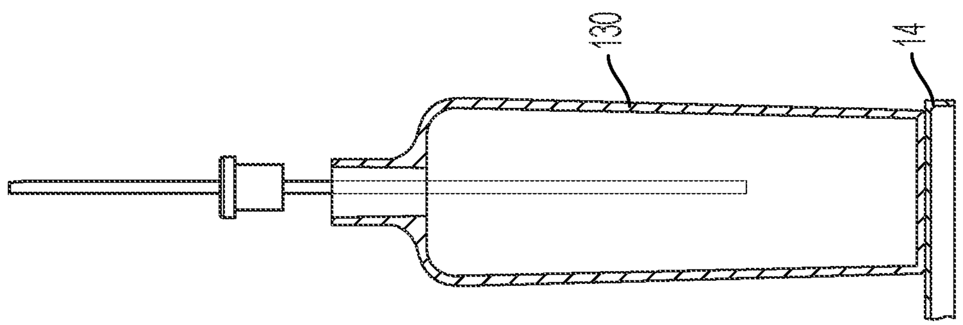
FIG. 7 illustrates a side view of a bottle during an attachment procedure.

As shown in FIG. 7, in order to attach the bottles 130 to the drink maker, the user inserts the rigid tube 30 into the bottle 130 and slide the grommet into the top of the bottle. The bottle attachment cap 100 can be flipped up to the position shown in FIGS. 8, 10 and 11 to allow for the bottle 130 to be slid into place on the stand 14 with the rigid tube 30 being able to slide into place at the hood 12. The bottle attachment cap 100 rotates up relative to the hood 12 and leaves a space 13 for the rigid tube 30. FIG. 8 illustrates the bottle 130 in place with the tube 30 situated in the hood 13. As shown in FIGS. 8 and 9, the cap 100 is rotatable downward to engage the tube 30. This operatively engages the bottle 130 to the drink maker 10 and allows liquids to be drawn from the bottle 130. Each of the six bottles 130 may be engaged to the drink maker 10 in a similar manner.

Figure 11:
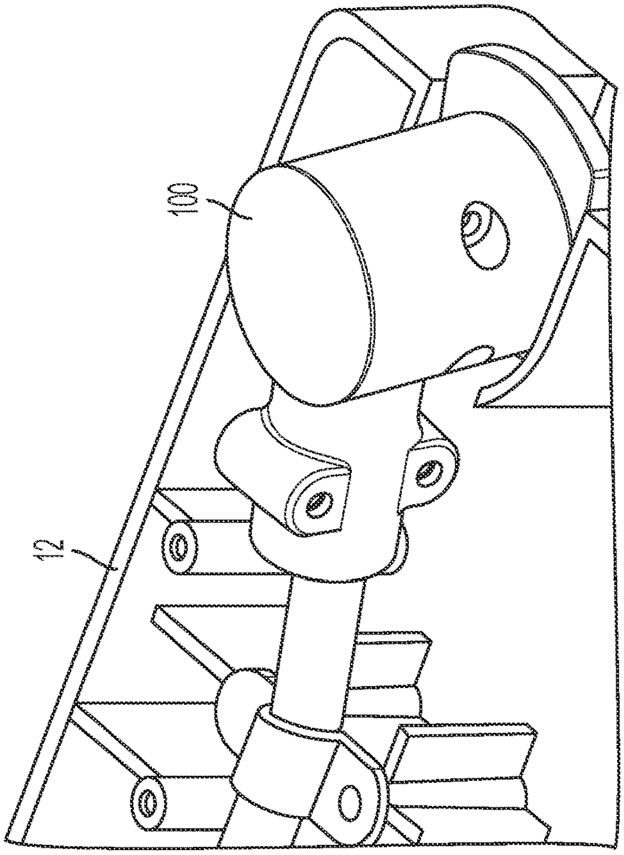
FIG. 11 is a top perspective view of a cap and a hood portion.
Figure 10:
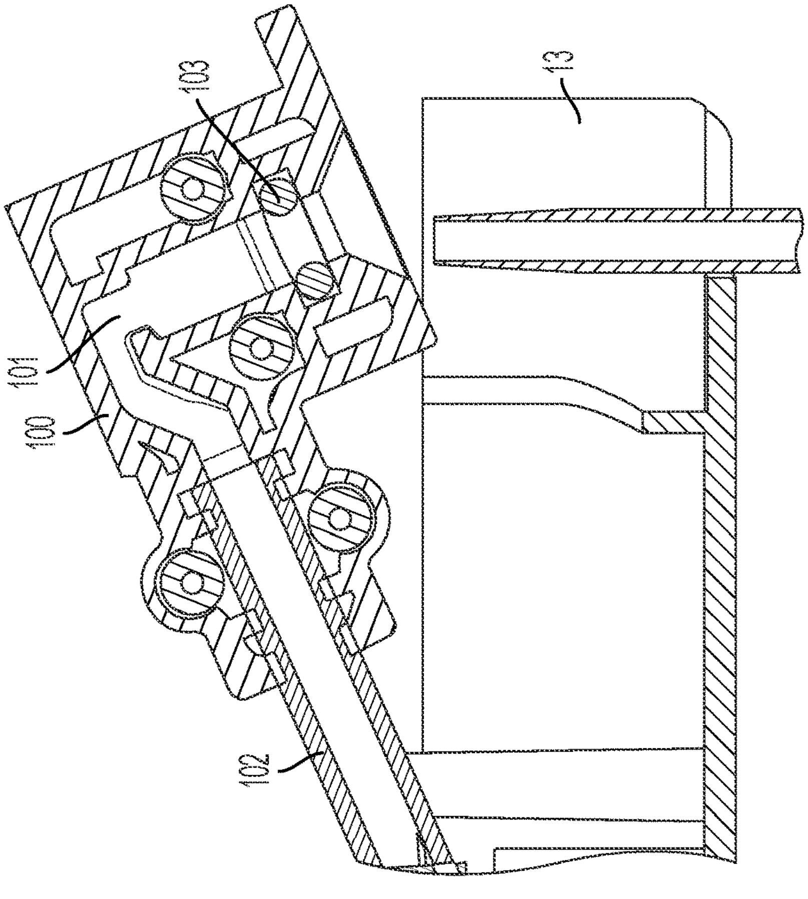
FIG. 10 is a close up cut-away view of an attachment portion.

FIG. 10 is a close up of the cap 100 and an end of the tube 30 in the space 13. FIG. 11 is a top perspective view of the cap 100 and a portion of the hood 12. FIG. 10 illustrates the cap 100 in a raised position. In the raised position, the bottles 130 with rigid tubes 30 can be placed so that the tubes 30 extend into the hood. The cap 100 can then be rotated downward into engagement with the tube 30. As shown in FIG. 10, the cap 100 includes a seal 103 that provides a tight seal with the tube 30. The seal 103 may be an O-ring. The cap 100 also includes an engagement portion 101 and a transfer portion 102. The engagement portion overlaps at least a portion with the tube 30 and can also serve as a conduit for liquid. The transfer portion 102 is a further conduit through which the liquids flow. The caps 100 may be connected together by a bar or other connector so that they move together allowing a user to raise or lower all of the caps 100 at once.

Figure 13:
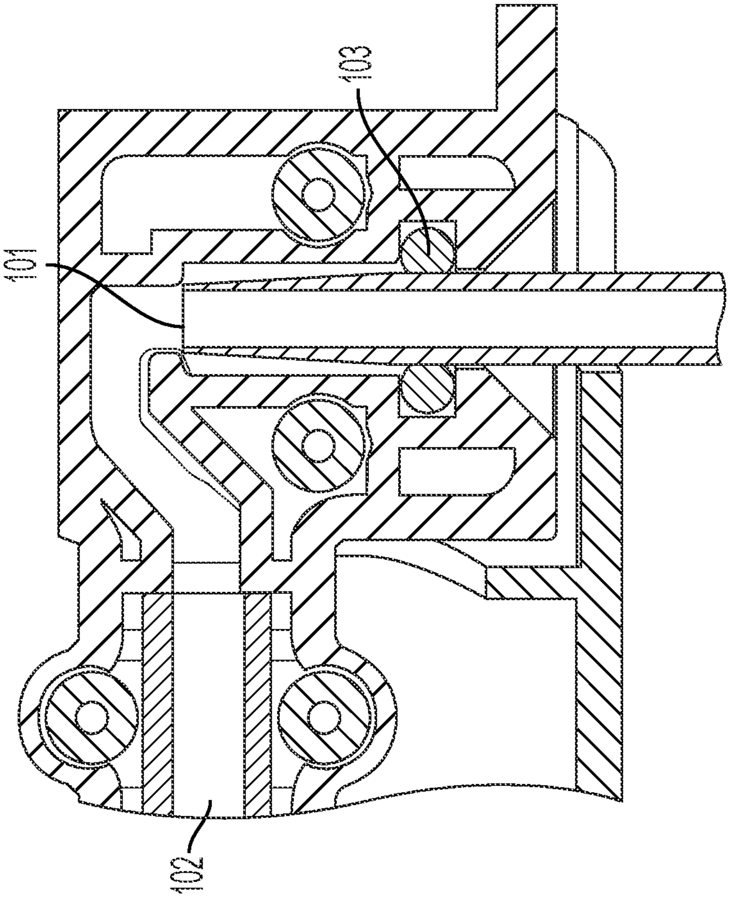
FIG. 13 illustrates a close up of an engagement of a bottle with the hood.
Figure 12:
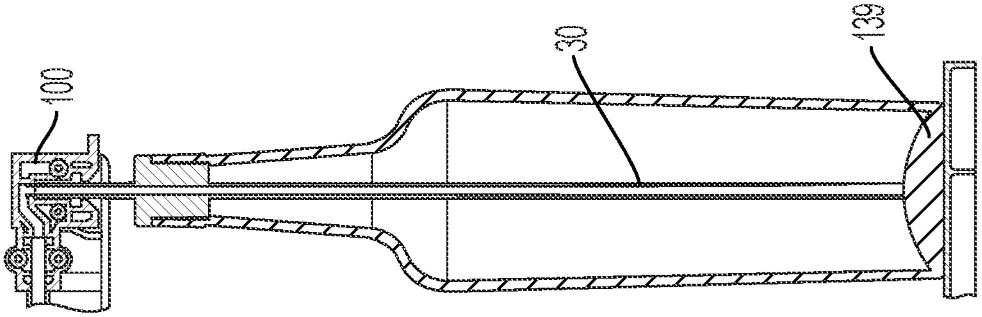
FIG. 12 illustrates a side view of a bottle during an attachment procedure.
Figure 15:
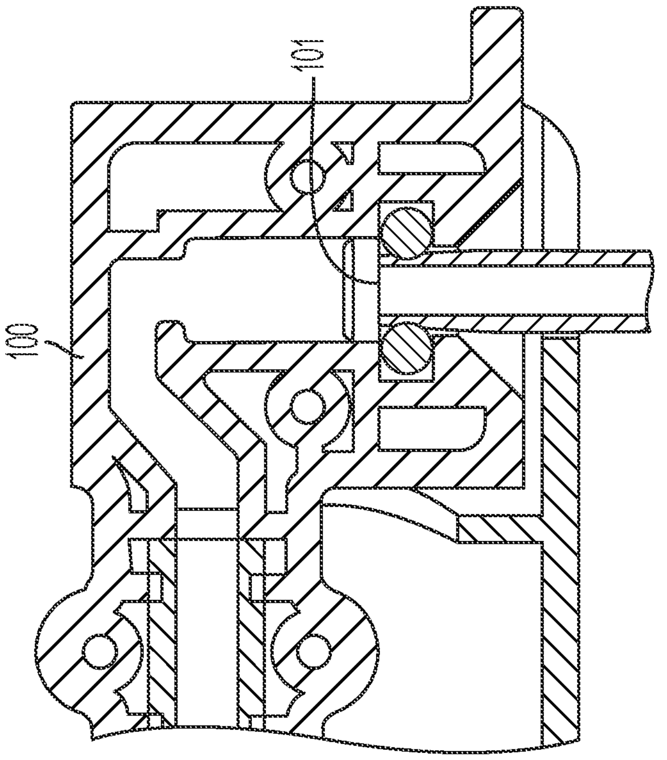
FIG. 15 illustrates a close up of an engagement of a bottle with the hood.
Figure 14:
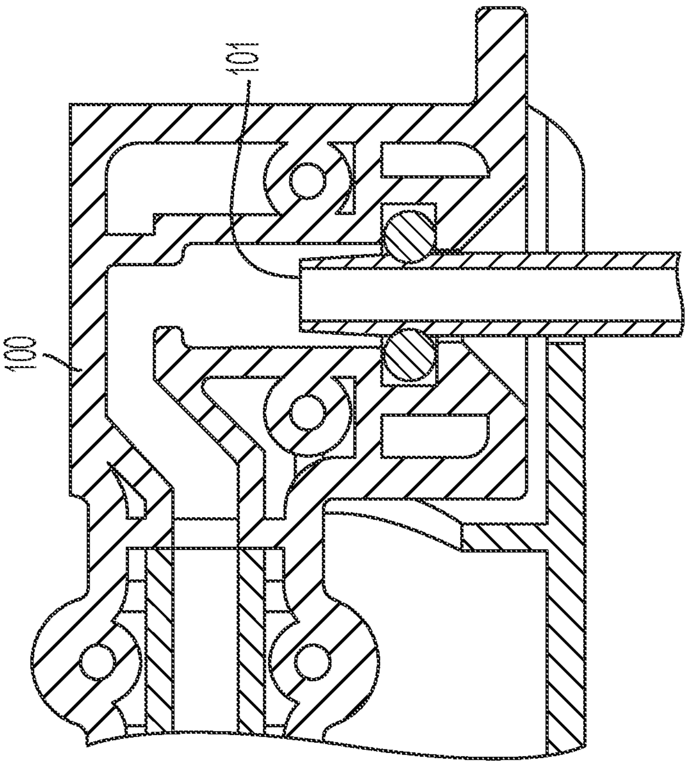
FIG. 14 illustrates a close up of an engagement of a bottle with the hood.

Some bottles 130 may have a flat bottom as shown in FIGS. 7, 8 and 9, while other bottles 130 may have a curved bottom 139, as shown in FIG. 12. When a bottle 130 has a curved bottom 139, the bottom surface raises the tube 30 because the curved bottom 139 is closer to the cap 100 than a flat bottom would be. As shown in FIGS. 13-15, the engagement portion 101 and tube 30 can be sized to accommodate different bottom surfaces for the bottle 130. As shown in FIGS. 13-15, the tube 30 may project different amounts into the engagement portion 101. FIG. 13 shows a situation where there is a bottle 130 with a large, curved bottom 139. In that case, the curved bottom 139 pushes the tube 30 fully into the engagement portion 101 of the cap 100. FIG. 14 illustrates a situation where there is a smaller curved bottom 139 and so the tube 30 projects slightly less into the engagement portion 101. FIG. 15 illustrates a situation where the bottle 130 includes a flat bottom. The tube 30 then projects a bit less into the engagement portion 101 than in the situation of FIG. 14. In each of FIGS. 13-15, the tube 30 projects to or past the seal 103 and so effectively engages with the cap 100. If the tube 30 projects at least far enough to fully engage the seal 103, an effective engagement is made.

Figure 16:
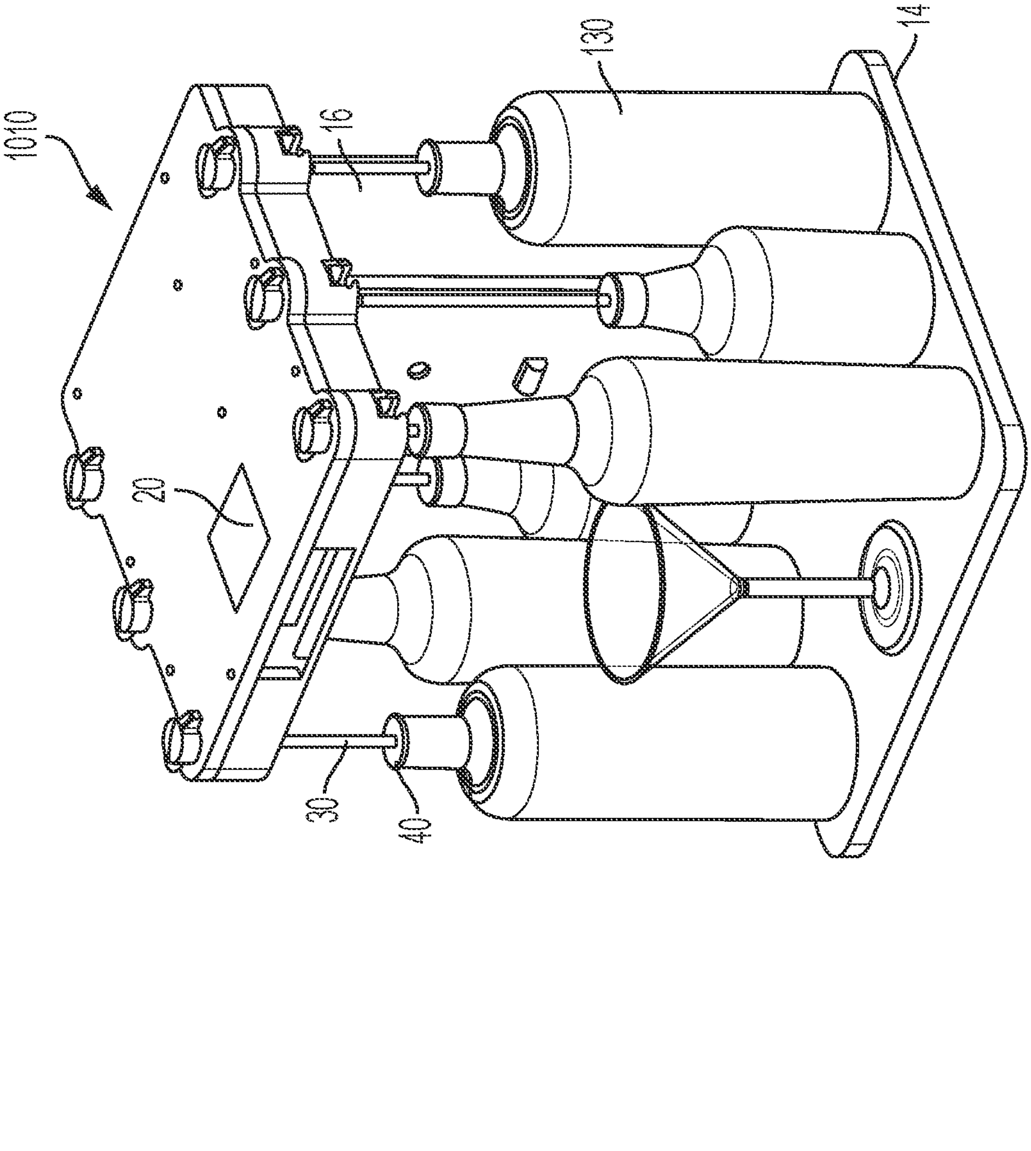
FIG. 16 illustrates a perspective view of a drink maker according to another exemplary embodiment.

Another exemplary embodiment of a drink maker 1010 is shown in FIG. 16. The drink maker 1010 operates in the same general manner as the drink maker 10 and parts should be assumed to be the same unless otherwise described. It is also contemplated that the features of the various embodiments can be combined or substituted where possible.

As shown in FIG. 16, the shape of the drink maker 1010 is slightly different than the shape of the drink maker 10 so that the bottles 130 are arranged in a different configuration. The base 1014 and the hood 1012 are substantially square shaped rather than the rectangular shape of the hood 12 and base 14. As before, the base 1014 serves as a base for the bottles 130 and glass 500 and may contain lighting, such as LED lights. The hood 1012 includes valves, hoses, pumps, a controller, circuit board, and other electronics or components, similar to the hood 12. The drink maker 1010 configuration of FIG. 16 may be used or combined with the various other embodiments.

Figure 17:
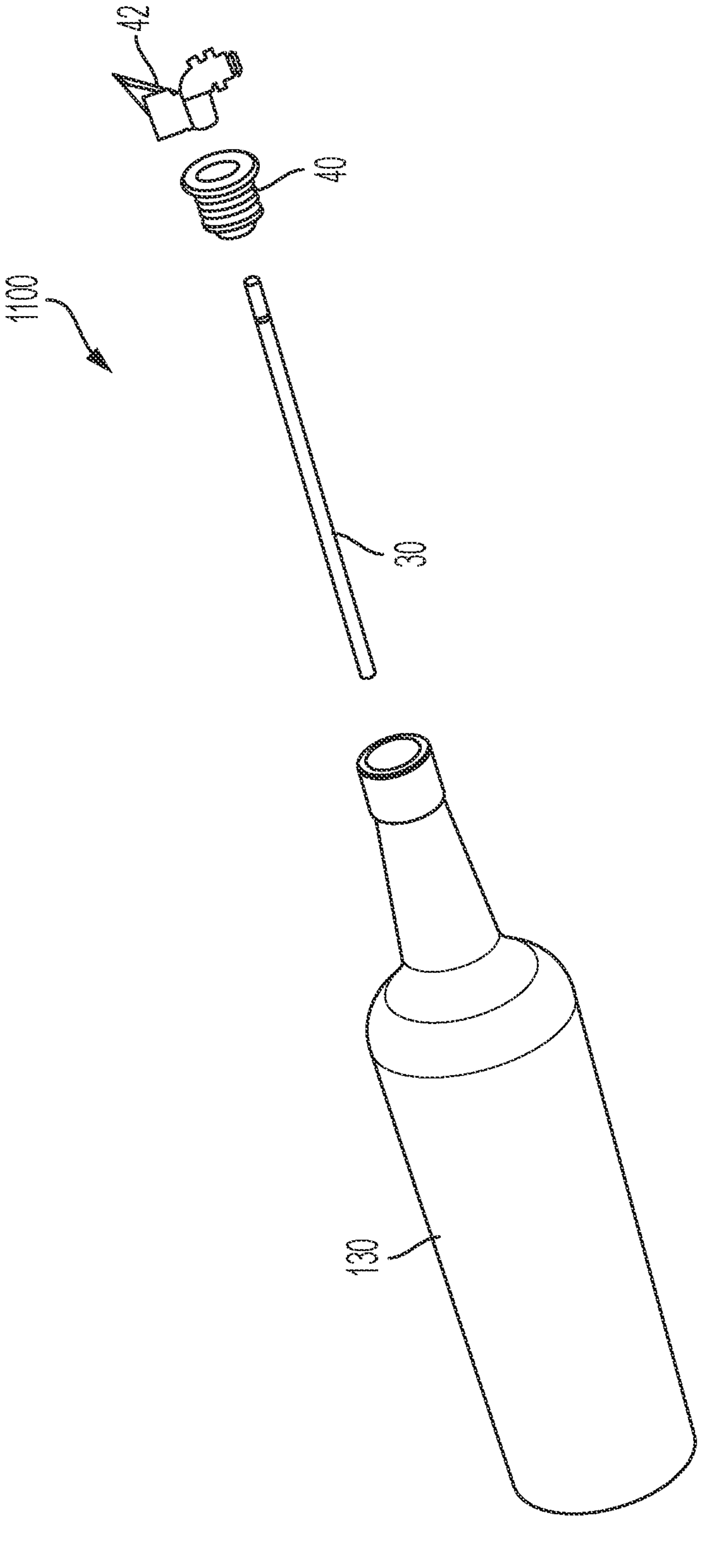
FIG. 17 is an exploded perspective view of a bottle and connection assembly according to an exemplary embodiment.
Figure 18:
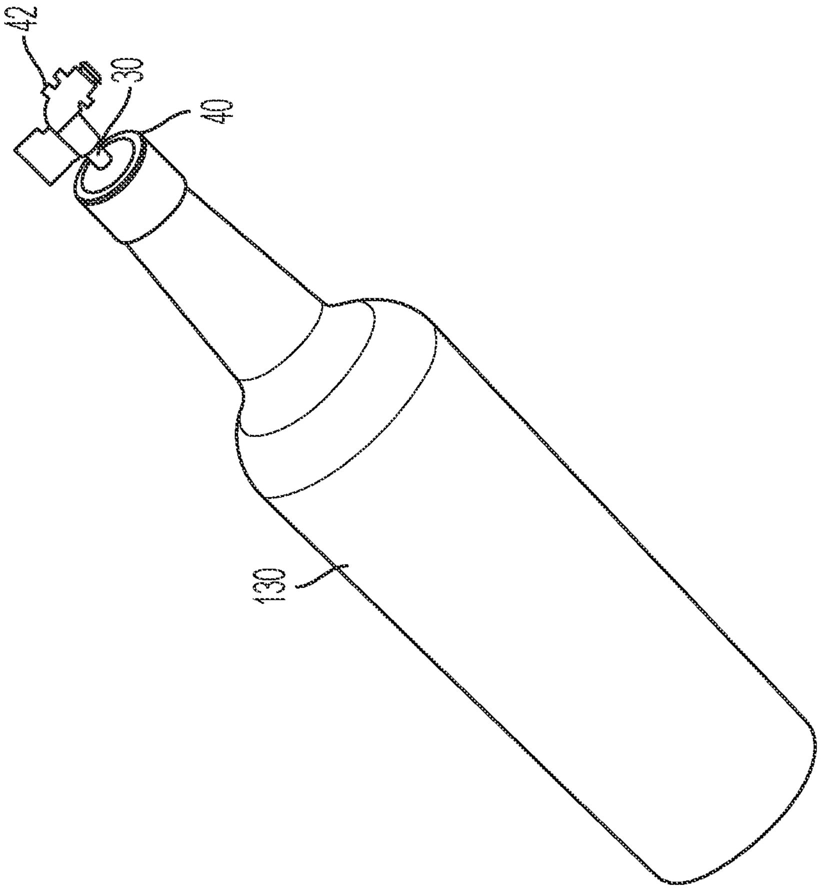
FIG. 18 is a perspective view of a bottle and connection assembly according to an exemplary embodiment.

FIGS. 17-33 illustrate another connection of the bottles 130 to the rest of the machine. This may be utilized in a drink maker with the configuration of drink maker 10 of FIG. 1 or drink maker 1010 of FIG. 16. FIG. 17 is an exploded view and FIG. 18 illustrates the bottle assembly. As shown in FIGS. 17 and 18, there is a bottle 130. The rigid tube 30 is inserted into the bottle 130 at one end and the bottle sealing grommet 40 at the other end. A nozzle 42 fits into the bottle sealing grommet 40. In the exemplary embodiment, the nozzle is a 90 degree nozzle that allows liquid to flow at 90 degrees.

Figure 19:
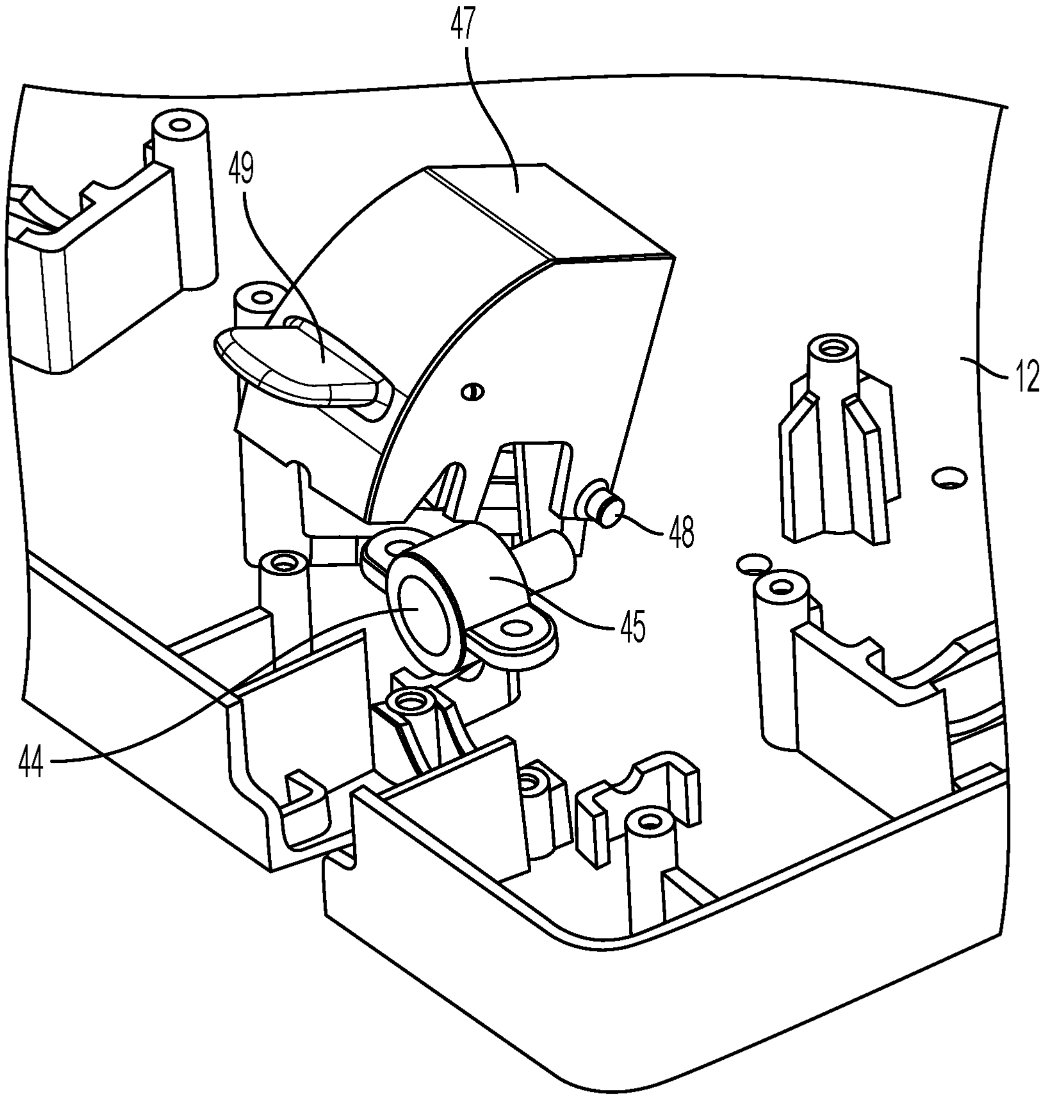
FIG. 19 illustrates a receiving structure according to the exemplary embodiment.

FIG. 19 illustrates the receiving structure that receives the nozzle 42 and has a portion of the hood 12 removed. As shown in FIG. 19, there is a coupler 45. The coupler 45 has a receiving end 44 that receives the nozzle 42 and an outlet end 46 that outlets to a hose or valve to transport liquid from the bottles 130 as previously discussed. As shown in FIG. 19, there is a cap 47. The cap 47 rotates around an axis provided by pegs 48 and includes a user tab 49 to allow a user to rotate the cap 47 open and closed. As shown in FIGS. 20-31, the cap 47 can be rotated to an open position to allow for the nozzle 42 to be connected to the coupler 45. The cap 47 can be rotated to a closed position to secure the nozzle 42 to the coupler 45. The caps 47 may be connected together by a bar or other structure so that a user may open and close the caps 47 all together. The connective structure may be a simple bar between the caps 47 near the user engagement portions or may be a more complicated structure. The connective structure may connect all of the caps 47 together or a subset. A similar connection may be used in other embodiments to operatively connect caps, levers or other rotating structures that are opened and closed to allow the insertion of the bottles or bottle assemblies.

Figure 20:
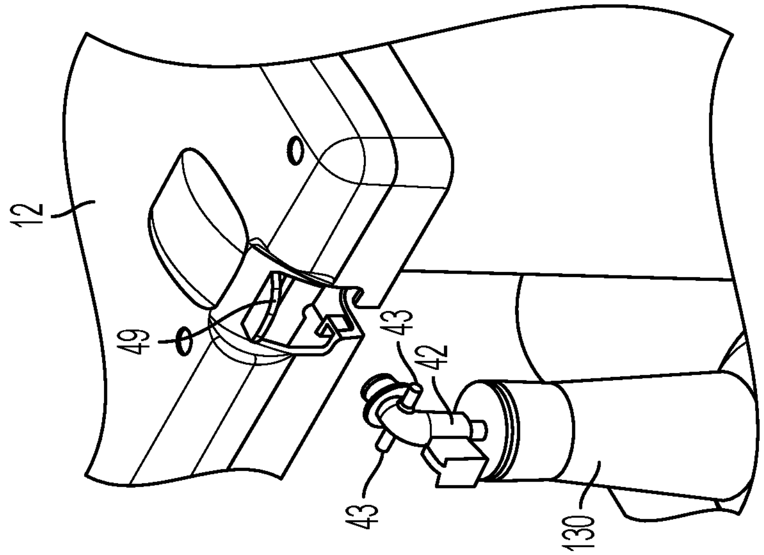
FIG. 20 illustrates a perspective view of an attachment of the bottle and hood according to an exemplary embodiment.
Figure 21:
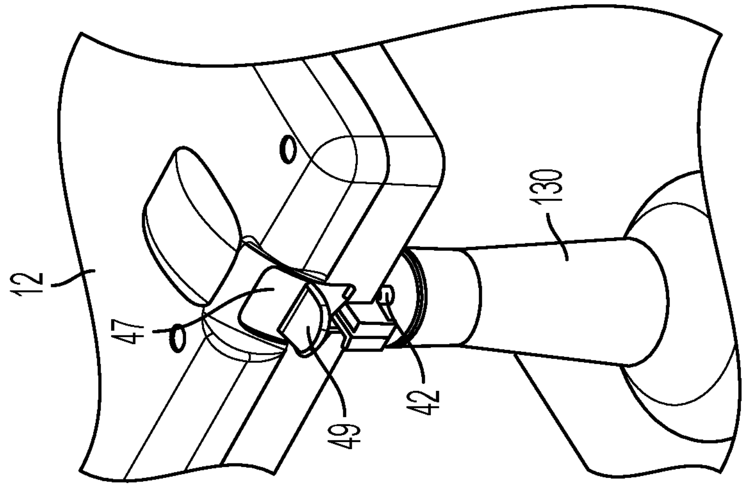
FIG. 21 illustrates a perspective view of an attachment of the bottle and hood according to an exemplary embodiment.
Figure 22:
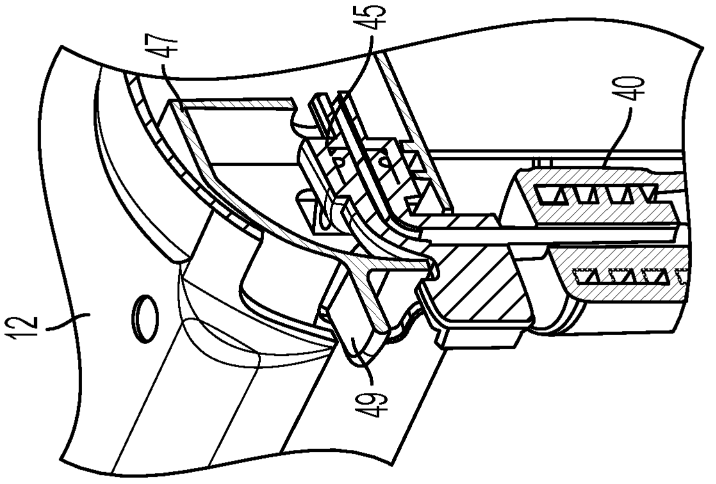
FIG. 22 illustrates a cut-away perspective view of an attachment of the bottle and hood according to an exemplary embodiment.

FIGS. 20-22 illustrate perspective views of the attachment of a bottle 130 to the hood 12. FIG. 20 illustrates a perspective view with the cap 47 in an open or unlocked position and the bottle 130 having the nozzle 42 attached. The bottle 130 is not connected to the hood 12. FIG. 21 illustrates the bottle 130 in the coupled position with the cap 47 rotated to the closed or locked position. In this position, the bottle 130 is engaged with the hood 12 and liquid can be supplied from the bottle 130. FIG. 22 is a cross sectional view of FIG. 21 showing the connection.

Figure 23:
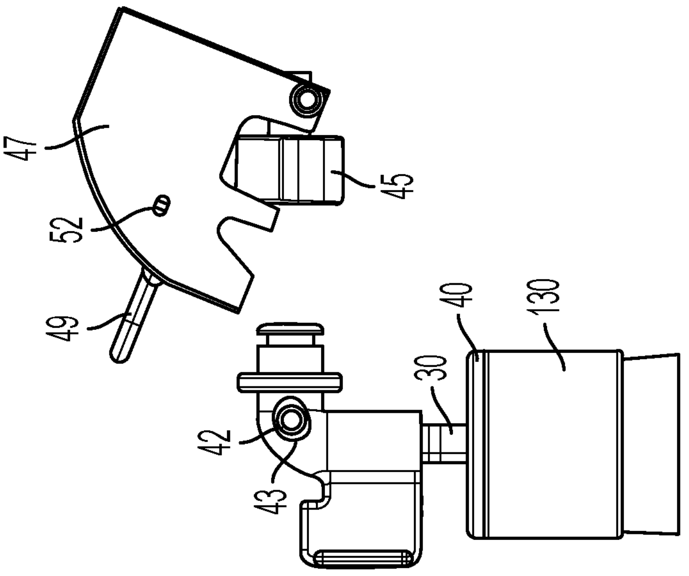
FIG. 23 illustrates a side view of a nozzle and cap connection according to an exemplary embodiment.
Figure 24:
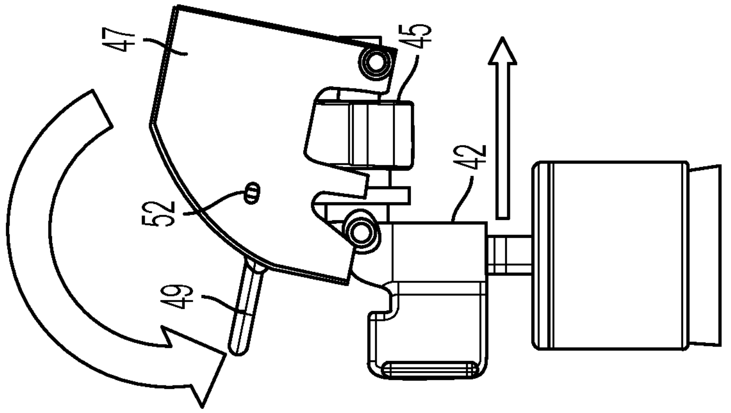
FIG. 24 illustrates a side view of a nozzle and cap connection according to an exemplary embodiment.
Figure 25:
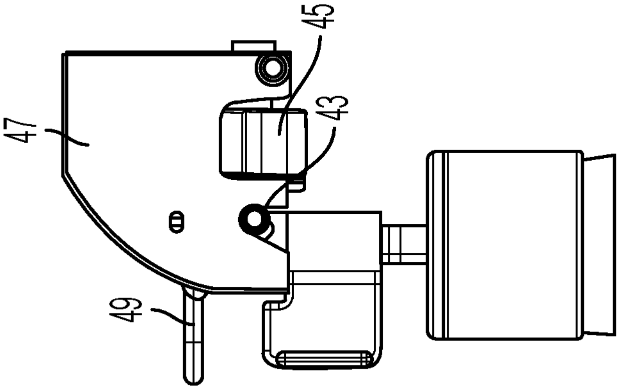
FIG. 25 illustrates a side view of a nozzle and cap connection according to an exemplary embodiment.

FIGS. 23-25 illustrate side views of the nozzle 42 and cap 47 connection area. As shown in FIGS. 23-25, the nozzle 42 includes tabs 43 and the cap 47 includes slots 51 which receives the tabs 43. FIGS. 23-25 are side views in which one tab 43 and slot 51 are shown, but there are corresponding tabs 43 and slots 51 on the opposite sides. For example, FIG. 20 shows a pair of tabs 43, one on each side. There are a pair of corresponding slots 51. FIG. 23 illustrates the cap 47 in an open position and the nozzle 42 disconnected from the coupler 45. The nozzle 42 is slid into the coupler in FIG. 24 and then the cap 47 can be rotated to a closed position, as shown by arrow A. Finally, FIG. 25 illustrates the nozzle 42 in the engaged position with the cap 47. As shown in FIG. 25, the tab 43 is engaged in the slot 51 so that the nozzle 42 is secured to the cap 47. The cap 47 may include a detent 52 to hold it in place.

Figure 28:
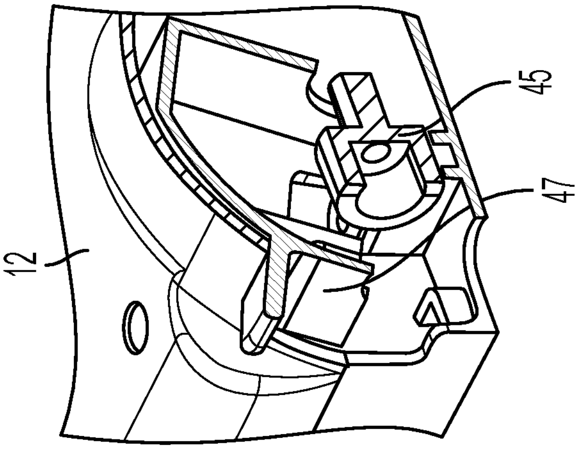
FIG. 28 illustrates a cut-away perspective view of the cap and hood.
Figure 27:
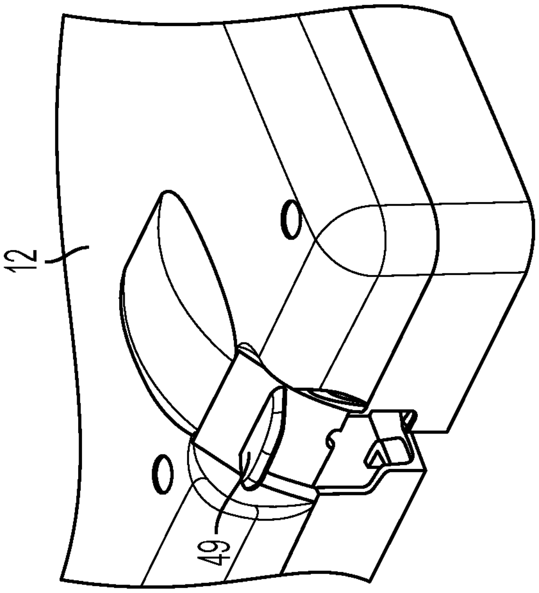
FIG. 27 illustrates a perspective view of the cap and hood.
Figure 26:
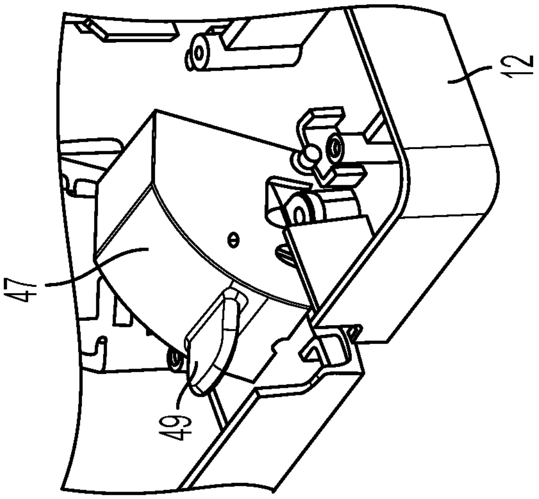
FIG. 26 illustrates a perspective view of the cap and hood with part of the hook housing partially removed.
Figure 29:
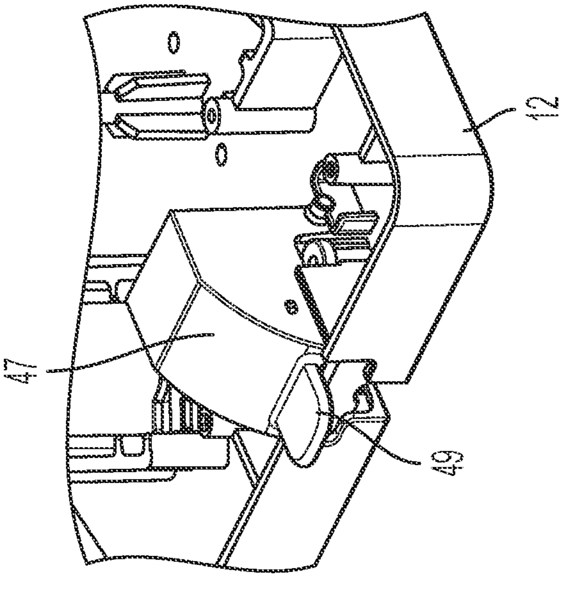
FIG. 29 illustrates a perspective view of the cap and hood with part of the hook housing partially removed.
Figure 30:
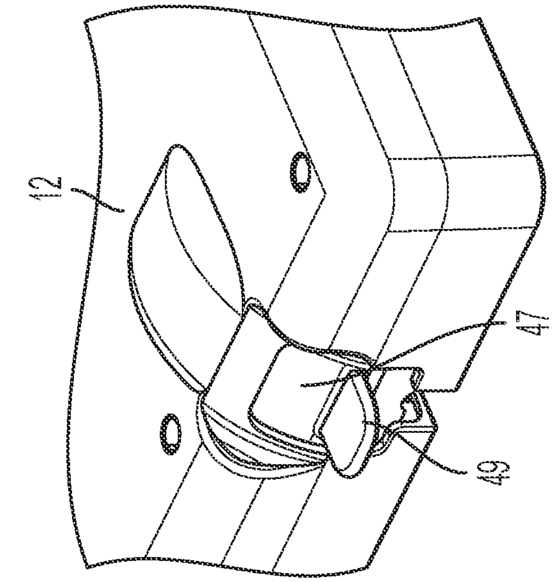
FIG. 30 illustrates a perspective view of the cap and hood.
Figure 31:
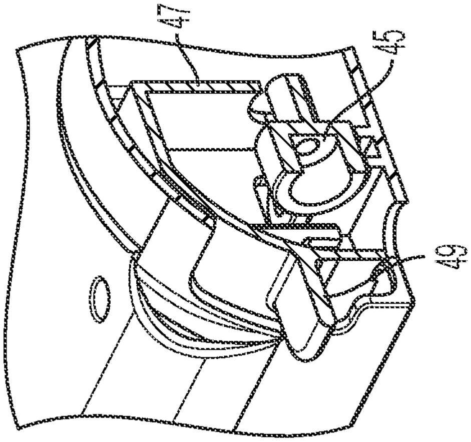
FIG. 31 illustrates a cut-away perspective view of the cap and hood.

FIGS. 26-28 illustrate various views of the cap 47 in an open position and FIGS. 29-31 illustrate various view of the cap 47 in the closed position. FIG. 26 is a perspective view of the cap 47 in an open position with part of the hood 12 partially removed. FIG. 27 is a perspective view of the cap 47 in the open position. FIG. 28 is a cut-away perspective view of the cap 47 in the open position.

FIG. 29 is a perspective view of the cap 47 in a closed position with part of the hood 12 partially removed. FIG. 30 is a perspective view of the cap 47 in the closed position. FIG. 31 is a cut-away perspective view of the cap 47 in the closed position.

Figure 33:
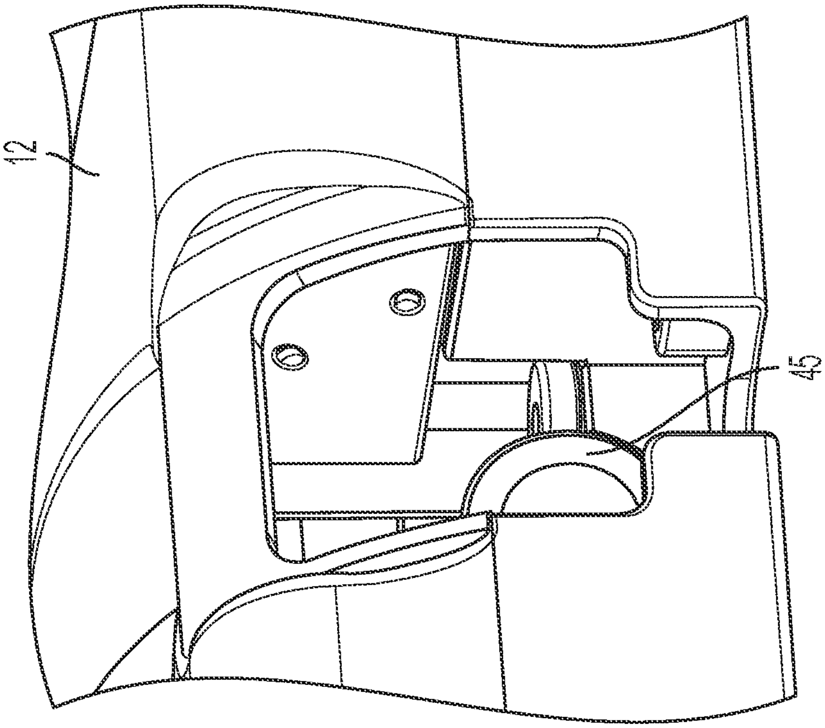
FIG. 33 illustrates a perspective view of the hood with the cap removed.
Figure 32:
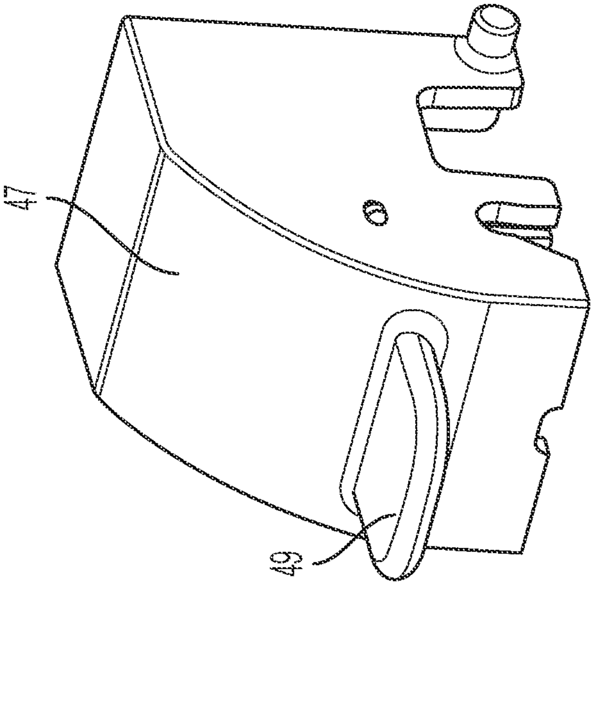
FIG. 32 illustrates a perspective view of the cap.

FIG. 32 is a perspective view of the cap alone. FIG. 33 is a perspective view of the hood 12 with the cap 47 removed.

Figure 34:
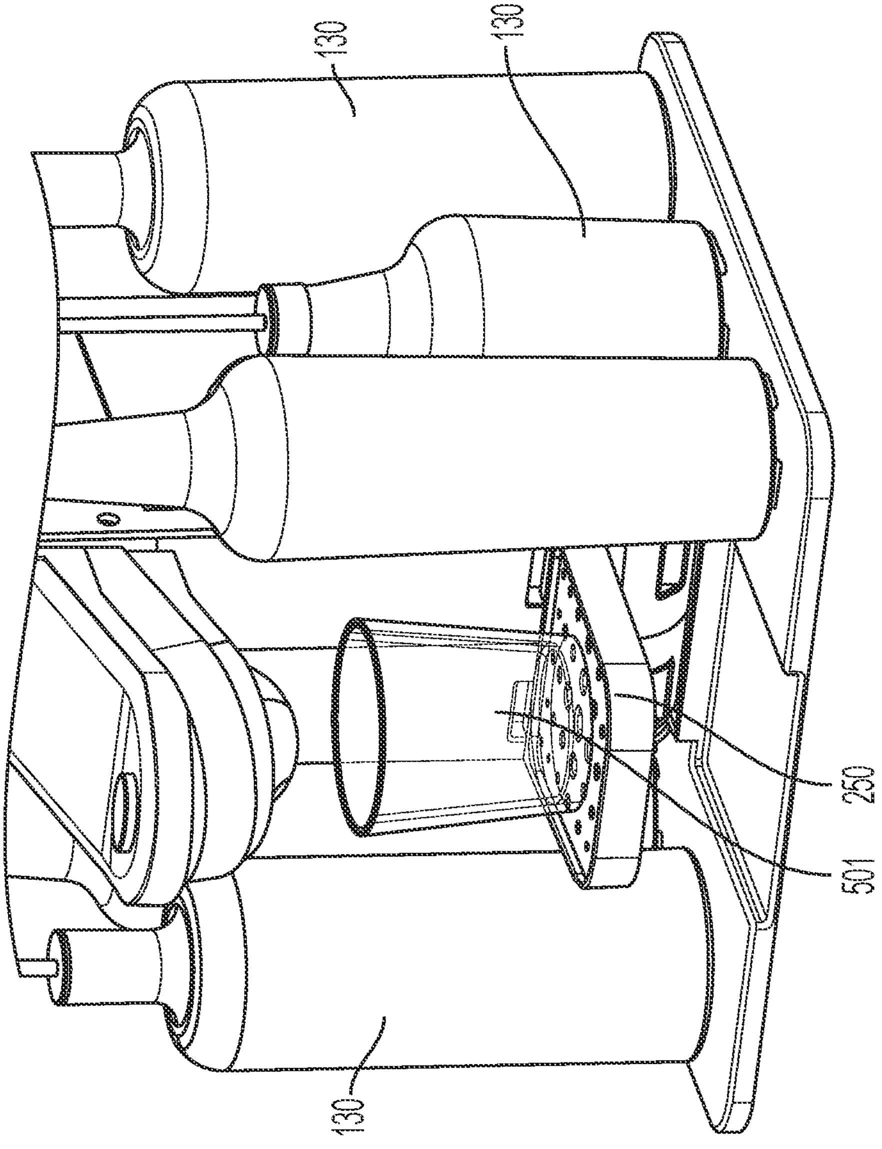
FIG. 34 illustrates a perspective view of an adjustable drip tray portion.

FIG. 34 illustrates an adjustable drip tray 250. The adjustable drip tray 250 can accommodate glasses of different sizes. For example, the drip tray 250 can be moved up if there is a smaller glass 501 as shown in FIG. 34 rather than the larger glass 500 shown in FIG. 1. The drip tray 250 may have projections that fit into grooves to adjust the height. Other configurations for making the drip tray 250 at different heights may also be used.

Figure 35:
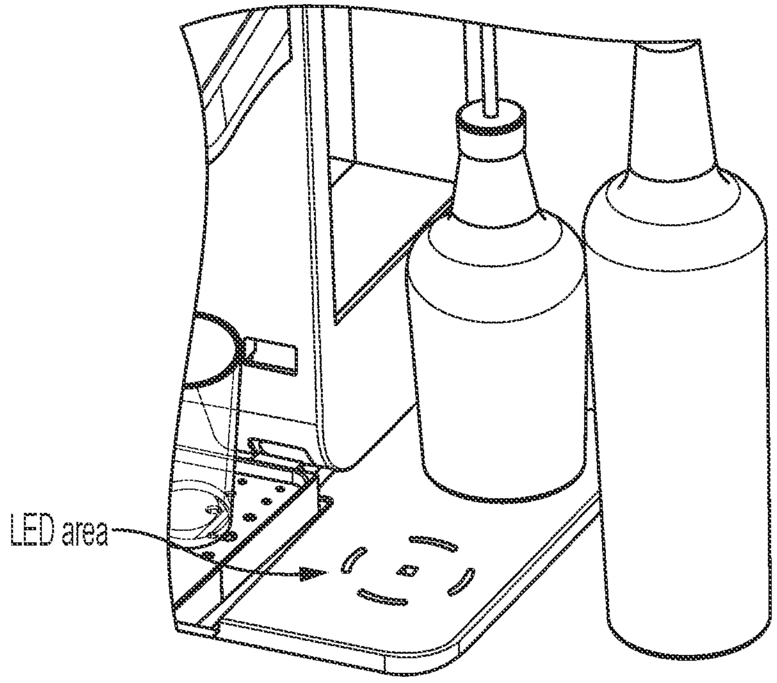
FIG. 35 illustrates a perspective view of an LED area.

FIG. 35 illustrates an LED area. Light emitting diodes (LEDs) may be disposed in the base 14 in order to illuminate the bottles 130. The LEDs may be a single LED per bottle or multiple LEDs like a ring of LEDs. The LEDs may also communicate information to the user such as error codes when the bottles are empty.

Figure 36:
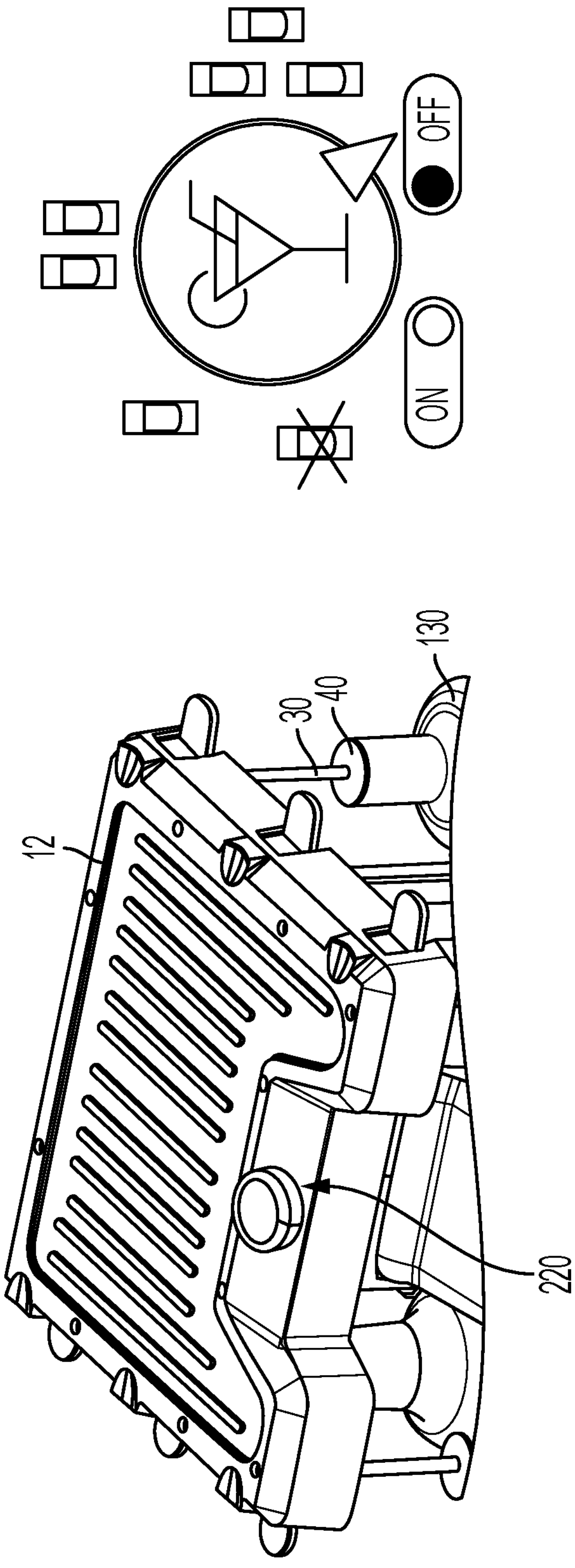
FIG. 36 illustrates a dial controller.
Figure 38:
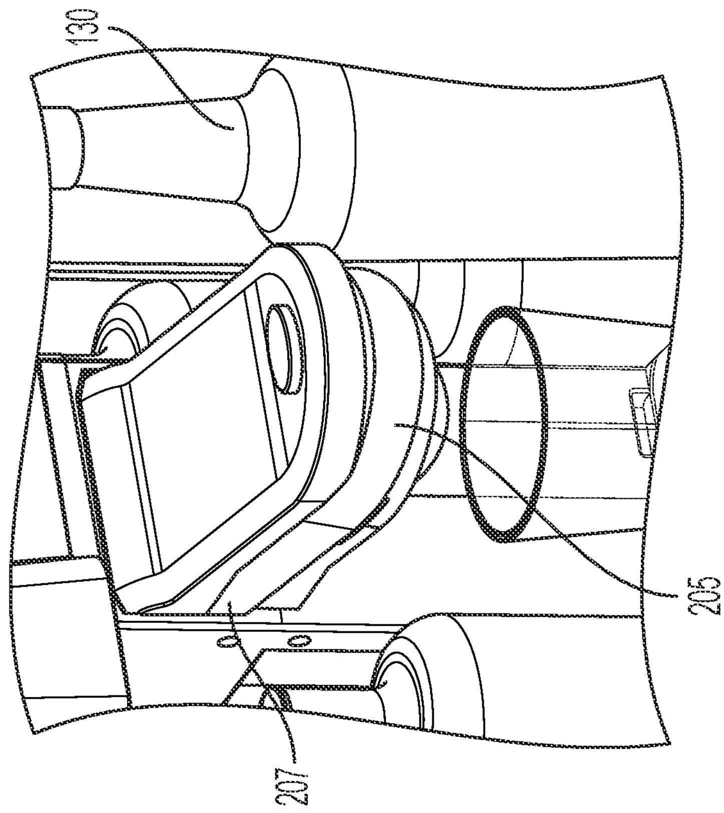
FIG. 38 illustrates a flavor pod holder.

FIG. 36 illustrates a dial controller 220 that may be used instead of the touch screen 20. The dial controller 220 allows a user to select the strength of the drink. For example, no alcohol, light, regular or strong. The amount of alcohol used in the drink can be varied based upon the selection. Instead of a dial 220, there may be other button inputs.

Figure 37:
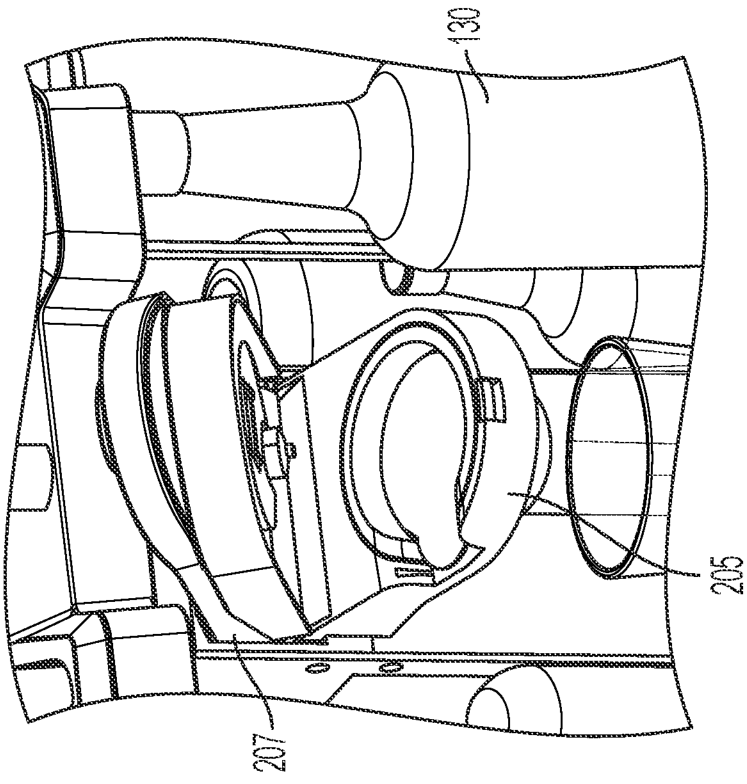
FIG. 37 illustrates a flavor pod holder.

FIG. 37 illustrates a front flavor pod holder 205 and lever 207. The holder 205 holds a capsule 150. The user inserts the capsule 150, closes the lever 207 to pierce the capsule 150. A spring loaded latch holds the lever 207 down when closed and a push button releases the latch to open the lever 207. The embodiment may include a metal detent system to hold the lever 207 in the open position in order to load the capsule 150.

Figure 39:
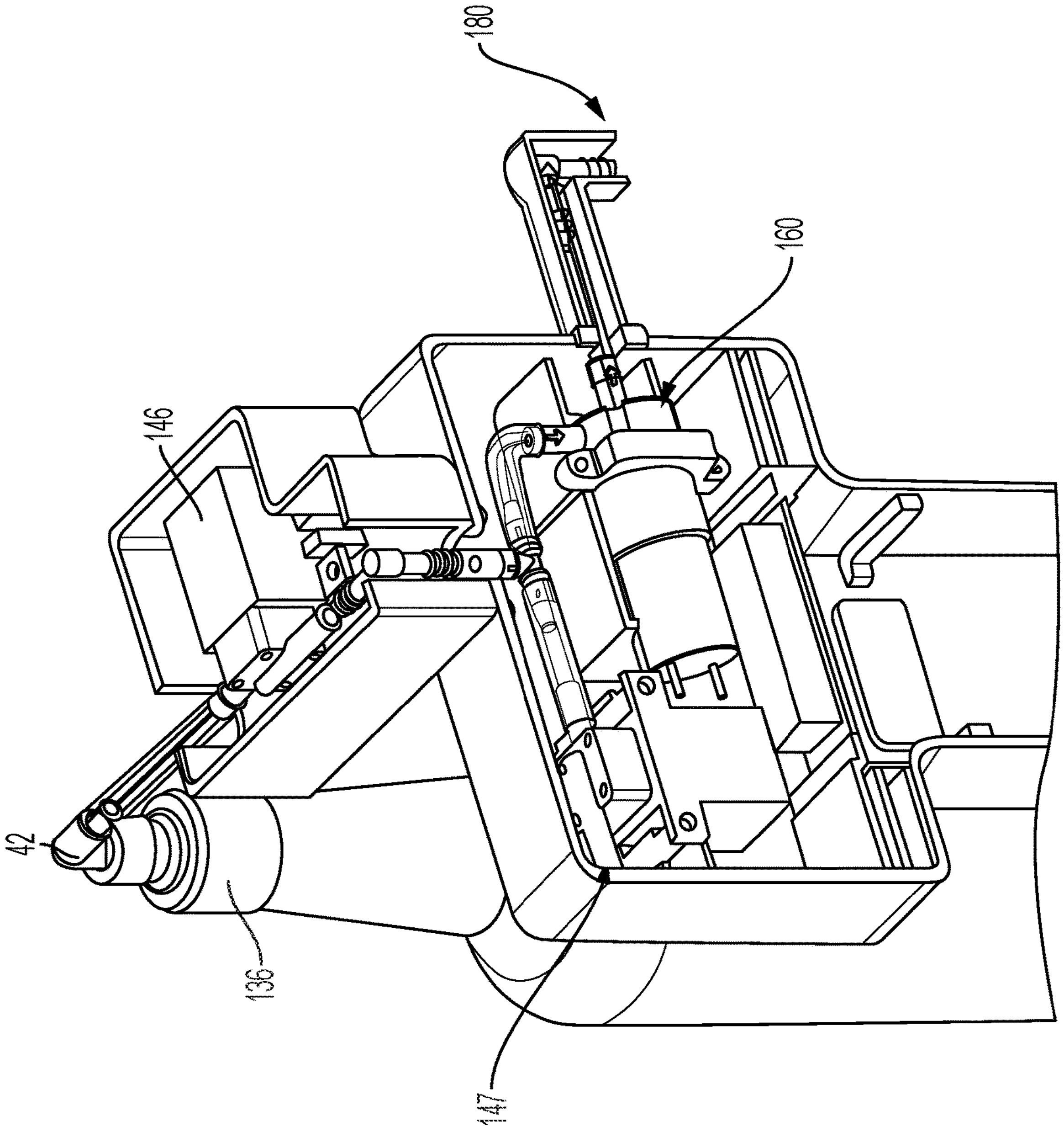
FIG. 39 illustrates a water detection structure.
Figure 40:
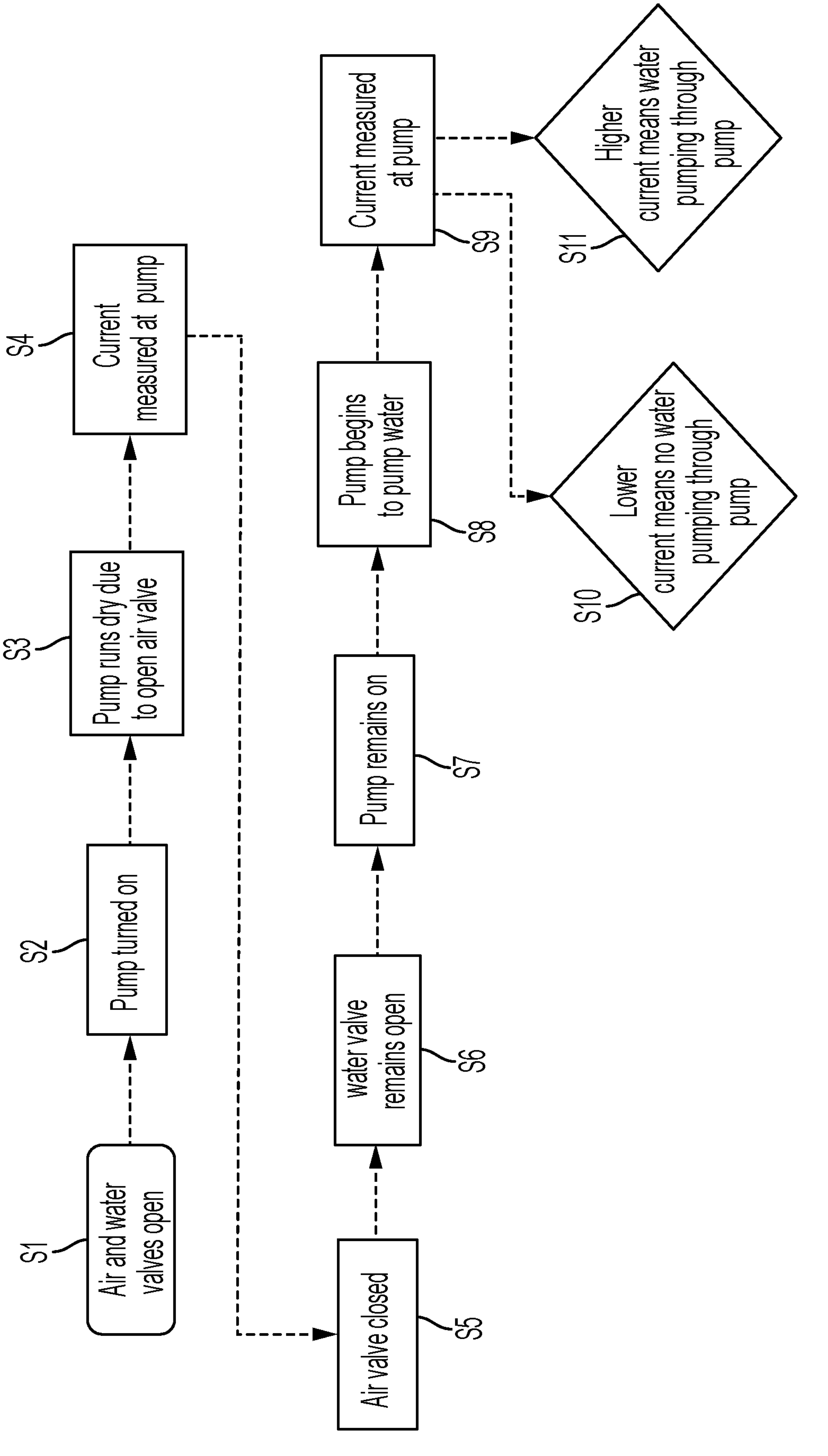
FIG. 40 illustrates a water detection method flow chart.

FIGS. 39 and 40 illustrate an exemplary water detection method. FIG. 39 illustrates the water bottle 136. It is connected through a nozzle 42 to tubing. The water bottle 136 may be connected by any method shown or described in this application. There is a water valve 146, a pump 160 and an outlet 180, as previously described with reference to FIG. 6.

Operation of the water detection is shown in FIG. 40. As shown in FIG. 40, the air valve 147 and water valve 146 are opened in step S1. Then, the pump 160 is turned on in step S2. The pump runs dry due to the open air valve 147 in step S3. In step S4, the current is measured at the pump 146. This may be done by a current sensor. The current sensor may be connected to the controller. In step S5, S6 and S7, the air valve 147 is closed while the water valve 146 remains open and the pump 160 remains on. Steps S5, S6 and S7 may happen simultaneously, nearly simultaneously or sequentially in in any order. The combination of steps S5-S7 causes the pump 160 to begin to pump water S8. In step S9, current is measured at the pump 160. The current may be compared to a threshold or otherwise evaluated. A relatively higher current means that water is pumping through the pump 160, indicating that there is water in the water bottle 136 (S11). A relatively lower current means that water is not pumping through the pump 160 (S10) and the water bottle 136 is empty and needs to be refilled. A user can be alerted to the situation by the display 20 or the previously described LED lights. There may be a single threshold for comparing the current or there may be low current threshold indicating no water pumping through the pump 160 and a high current threshold meaning water is pumping through the pump 160. A measurement in between the high and low current thresholds may indicate the need to do further measurements or that the measurement is indefinite.

Figure 41:
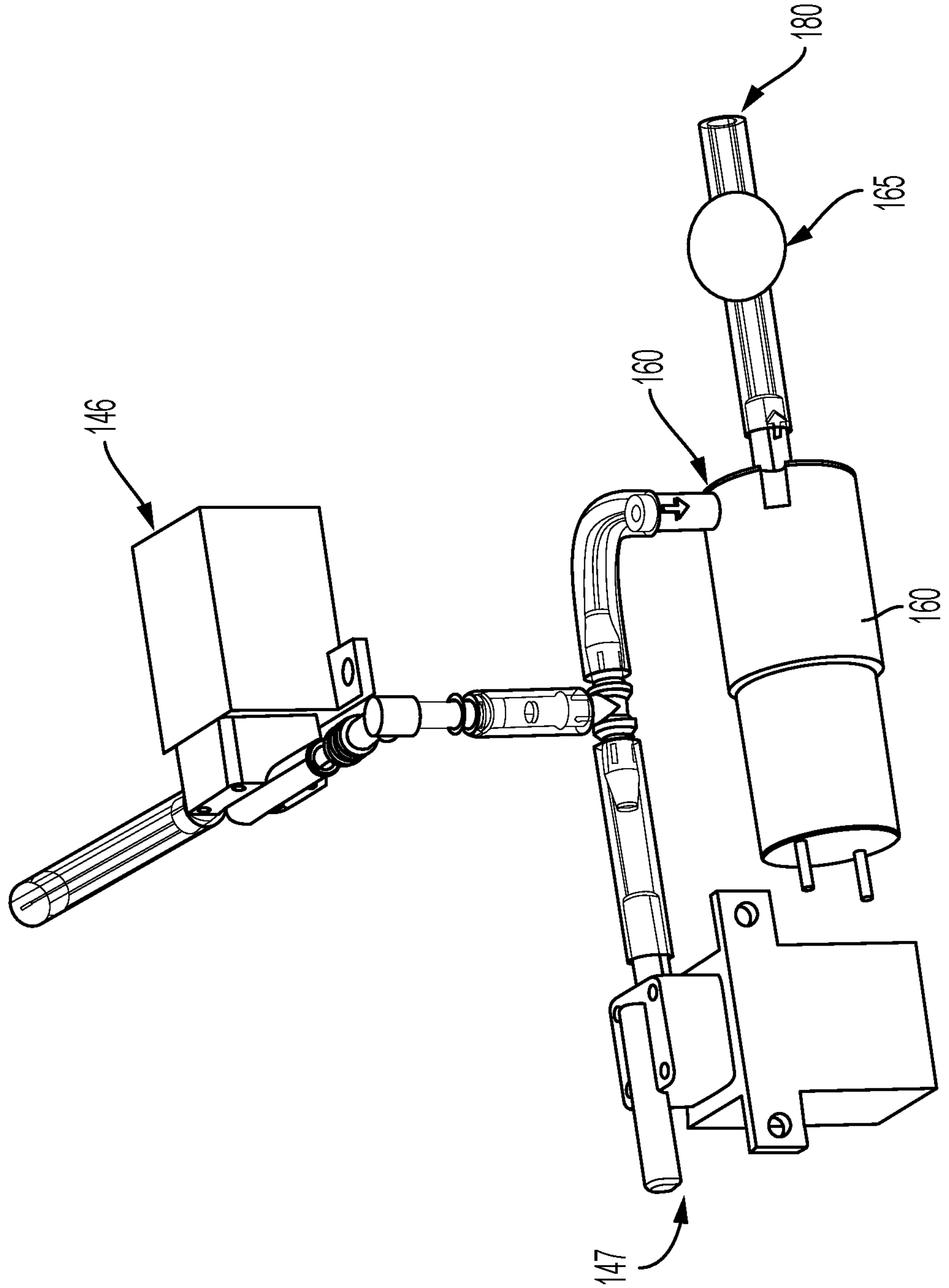
FIG. 41 illustrates another water detection structure.
Figure 42:
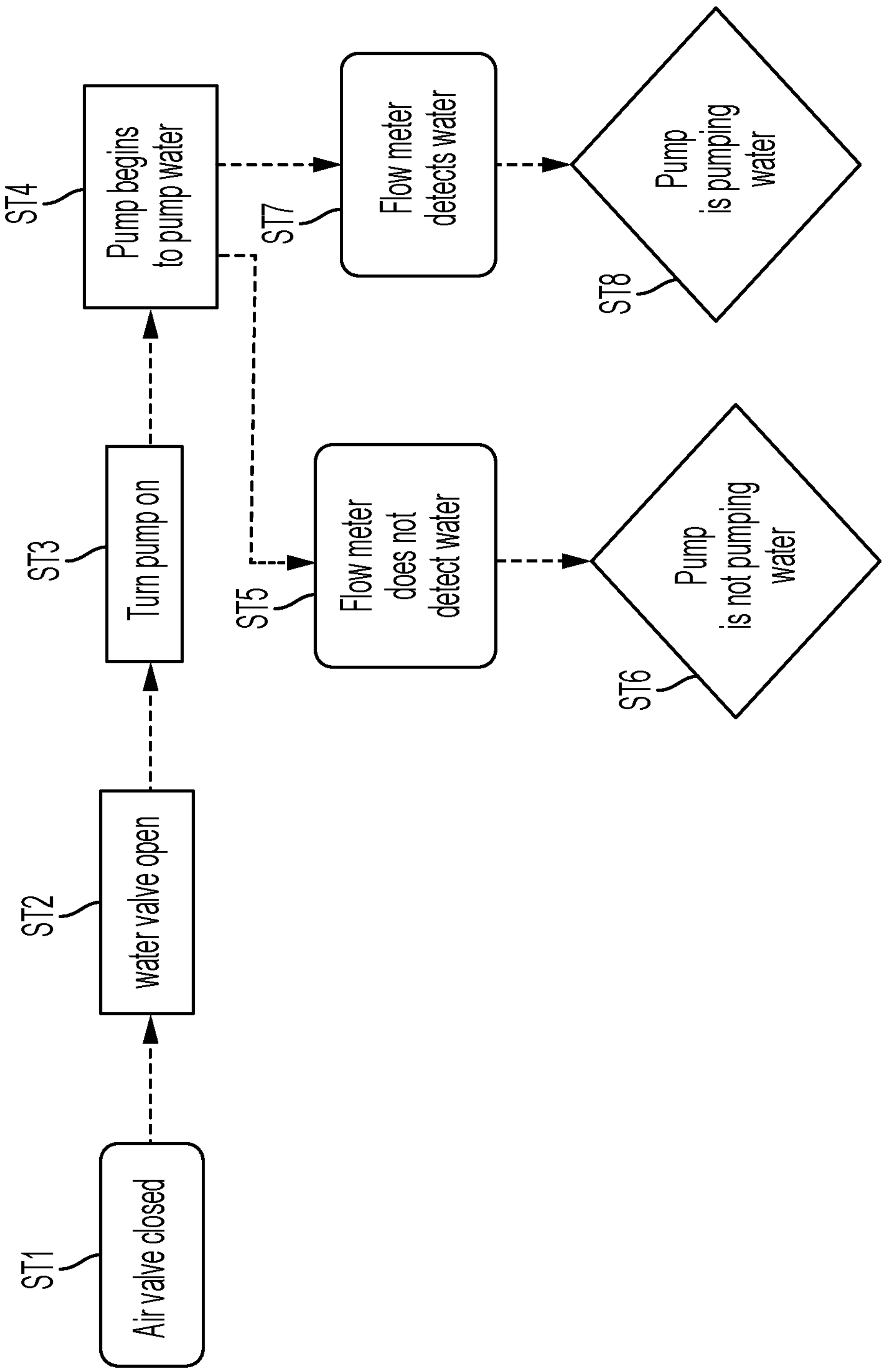
FIG. 42 illustrates a water detection method flow chart.

FIGS. 41 and 42 illustrate a second exemplary embodiment of a water detection. In the embodiment of FIGS. 41 and 42 a flow meter 165 is disposed downstream of the pump 160 and near the outlet 180. The flow meter 165 directly measures the flow of water and can determine if water is flowing. The flow meter 165 is operatively connected to the controller.

Operation of the second exemplary embodiment of water detection is shown in FIG. 42. As shown in FIG. 42, in ST1, the air valve 147 is closed. In step ST2, the water valve 146 is opened. In step ST3, the pump 160 is turned on and so in step ST4, the pump 160 begins to pump water. If the flow meter 165 does not detect water (ST5), then it is determined that the pump 160 is not pumping water (ST6) and the water bottle 136 may be empty. If the flow meter 165 does detect water (ST7), then it is determined that the pump 160 is pumping water (ST8).

FIGS. 43-54 illustrate another exemplary embodiment of a connection system for connecting the bottles to the drink maker. The connection system may be used with the configuration of the drink maker 10 of the configuration of the drink maker 1010. The connection system of FIGS. 43-54 utilizes a spring-loaded lever, as will be described.

Figure 43:
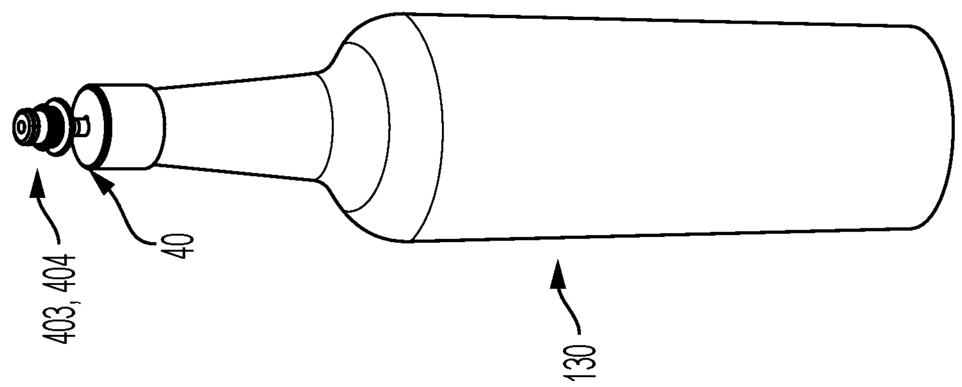
FIG. 43 illustrates a bottle connection system according to another exemplary embodiment.
Figure 44:
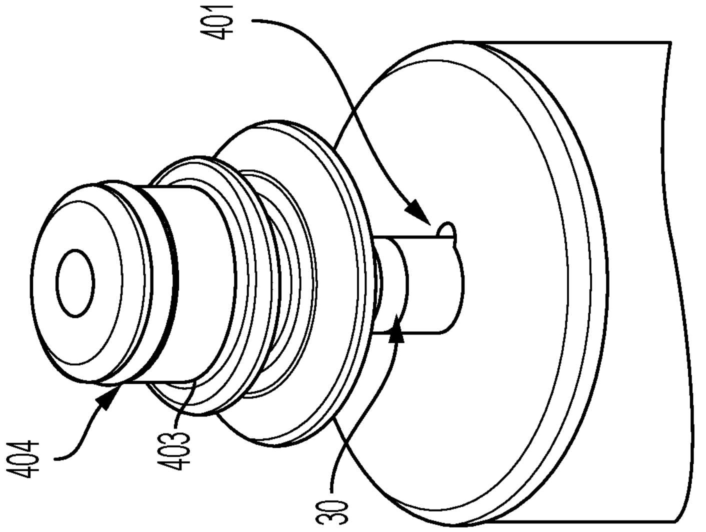
FIG. 44 illustrates a perspective view of the bottle connection system.
Figure 45:
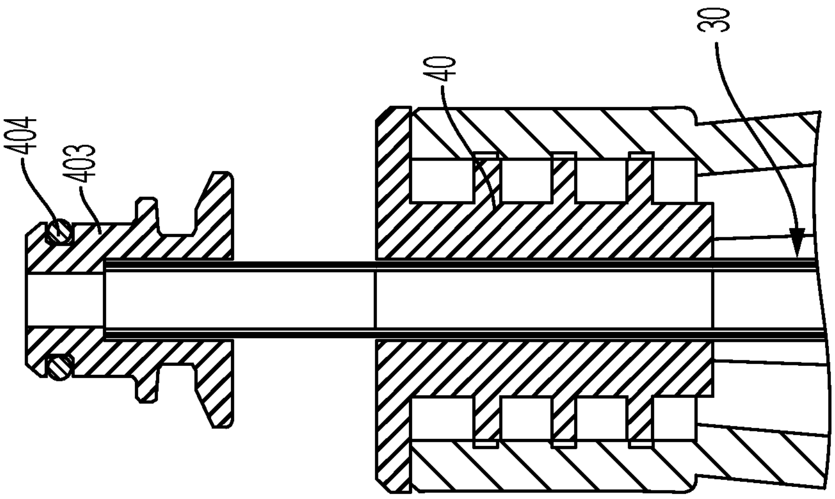
FIG. 45 illustrates a perspective view of the bottle connection system.

FIGS. 43-45 illustrates a bottle 130 with a bottle sealing grommet or rubber plug 40 and a rigid tube 30 as previously described. In this instance a nozzle 403 with an O-ring 404 is attached to a top end of the rigid tube 30. As shown in FIG. 44, the grommet 40 includes a small air vent 401 so that a vacuum is not created inside the bottle when the liquid is pumped out.

Figure 47:
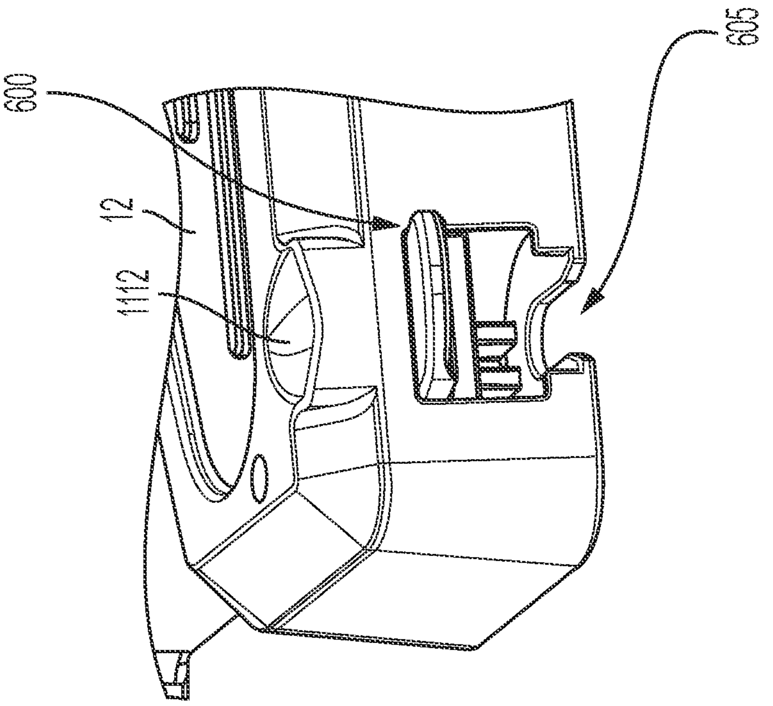
FIG. 47 illustrates a perspective side view of a lever and hood.
Figure 46:
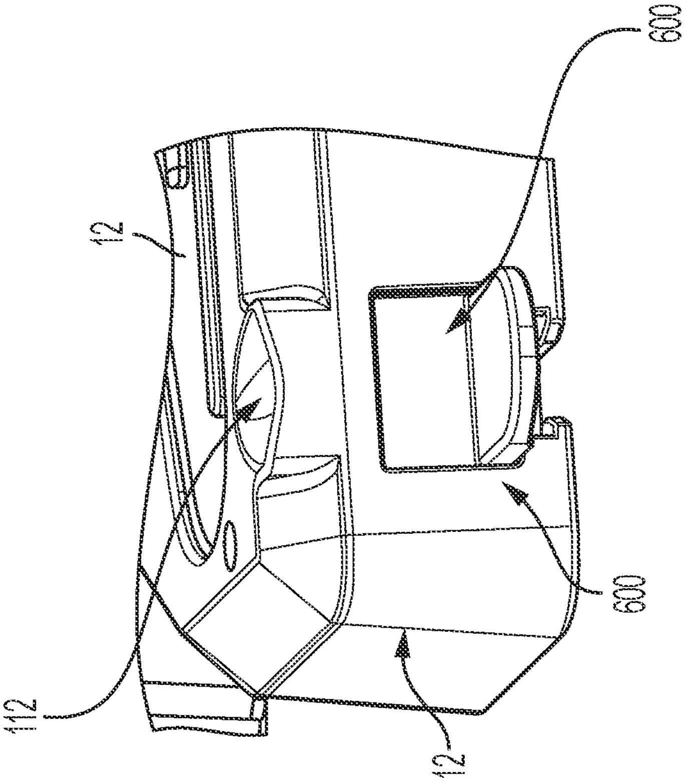
FIG. 46 illustrates a perspective side view of a lever and hood.

FIGS. 46 and 47 illustrate side view of the spring-loaded lever 600 in the hood 12. The hood 12 may include a depressed area 1112 for a user's finger. The lever 600 is shown in the closed or locked position in FIG. 46 and in the open or unlocked position in FIG. 47.

Figure 49:
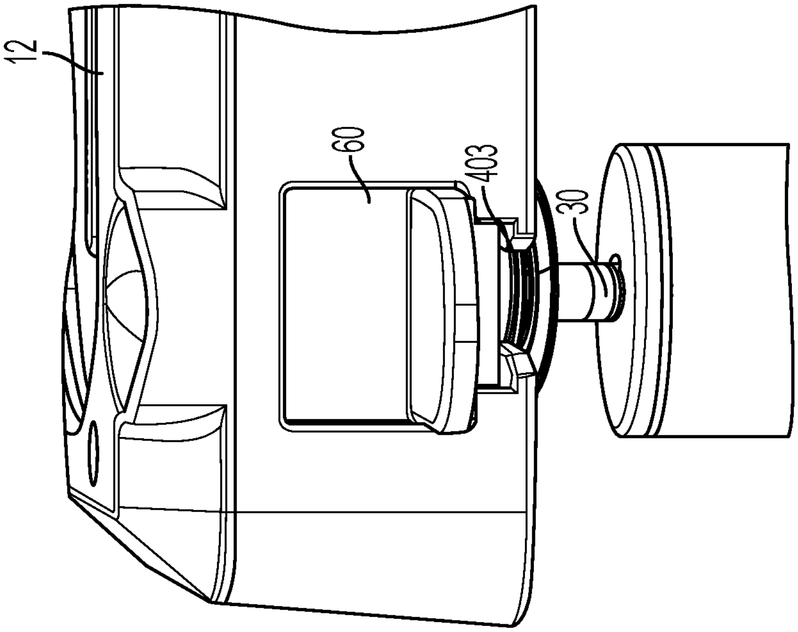
FIG. 49 illustrates a perspective side view of a lever, hood and bottle.
Figure 48:
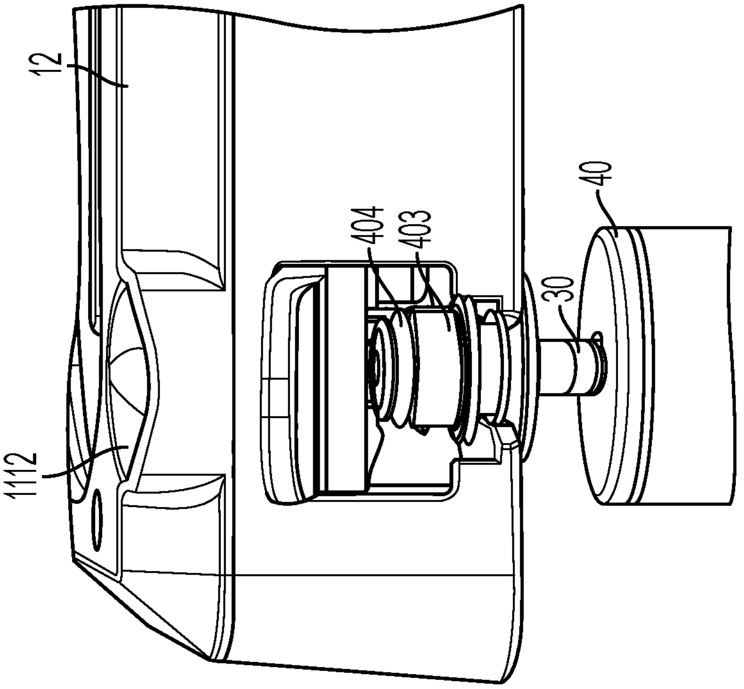
FIG. 48 illustrates a perspective side view of a lever, hood and bottle.

FIGS. 48 and 49 illustrate a side view of the spring-loaded lever 600 with the bottle 130 and nozzle 403. FIG. 48 illustrates the nozzle 403 in the opening 60 and FIG. 49 illustrates the nozzle 403 with the lever 600 in the closed position to secure the nozzle 403.

Figure 50:
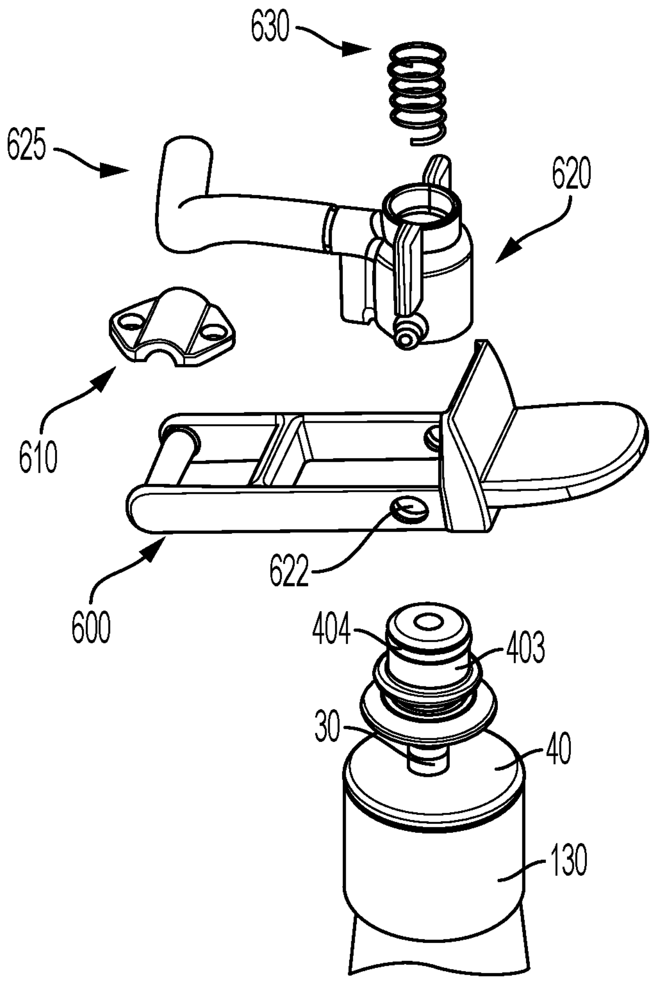
FIG. 50 illustrates an exploded view of a spring loaded lever assembly.
Figure 51:
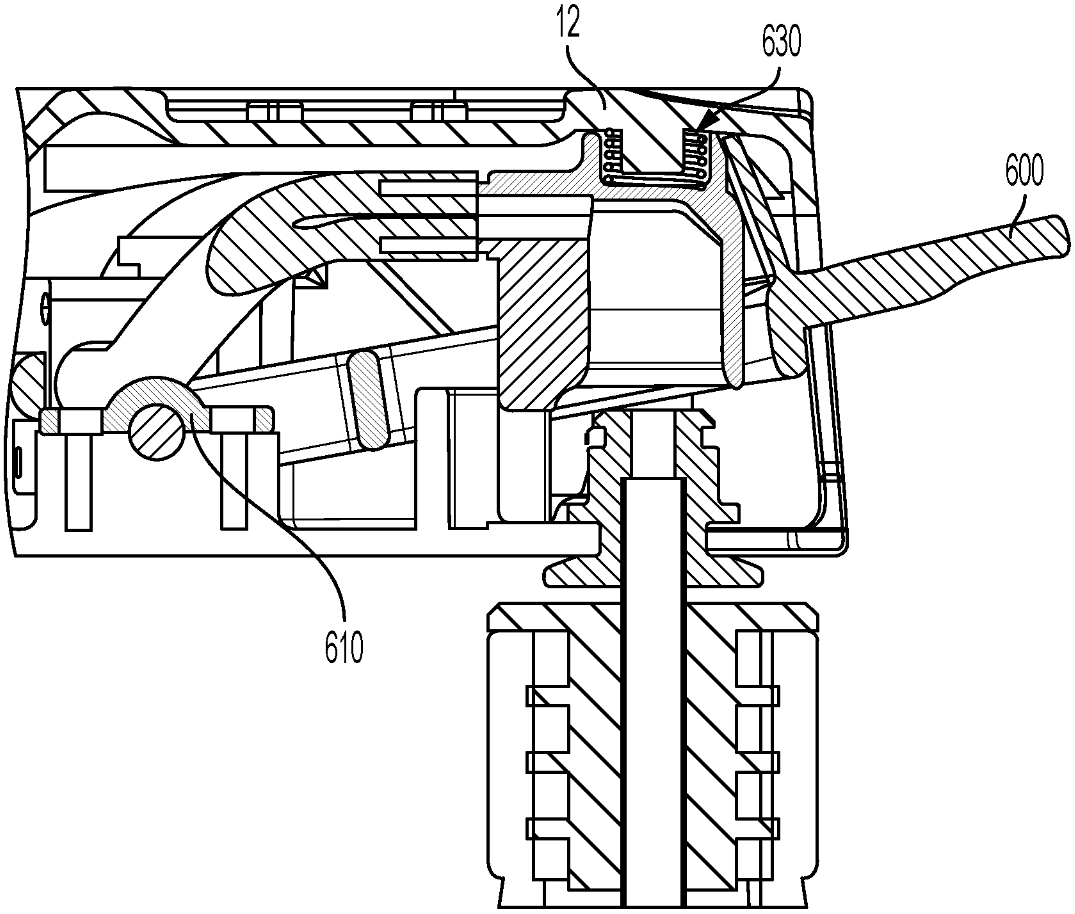
FIG. 51 illustrates a cross-sectional view of the spring loaded lever assembly.

Details of the spring loaded lever assembly are shown in FIGS. 50 and 51. As shown in FIG. 50, the spring loaded lever assembly includes the spring loaded lever 600. A lever pivot clamp 610 secures the lever in place. A sealing member 620 is disposed in the hood 12 and provides a connection to the nozzle 403. The sealing member 620 is connected to a hose 625 which connects to the various plumbing components housed in the hood 12, as shown in FIG. 6. A spring 630 biases the assembly.

FIG. 51 illustrates the spring-loaded assembly in the hood 12. As shown in FIG. 51, the hose 625 attaches to the back of the sealing member 620 to connect to the pluming system. The lever 600 rotates about a pivot point that is created by the lever pivot 610. In the position shown in FIG. 51, the spring 630 is fully compressed so that is pushes down on the sealing member 620, which in turn pushes down on the lever 600. The sealing member 620 rides on rails and can translate linearly up and down in the hood 12. The lever 600 has holes 622 and the sealing member 620 has nubs 621 which engage with the holes 622 so that the sealing member 620 and the lever 600 are engaged with one another and move together. In the position of FIG. 51, the lever 600 is moved to the open position by the user so that the nozzle 403 can be slid into the opening 605. The user can release the lever and the spring 630 will then push the sealing member 620 into engagement with the nozzle 403 to secure the bottle 130 to the drink maker.

Figure 52:
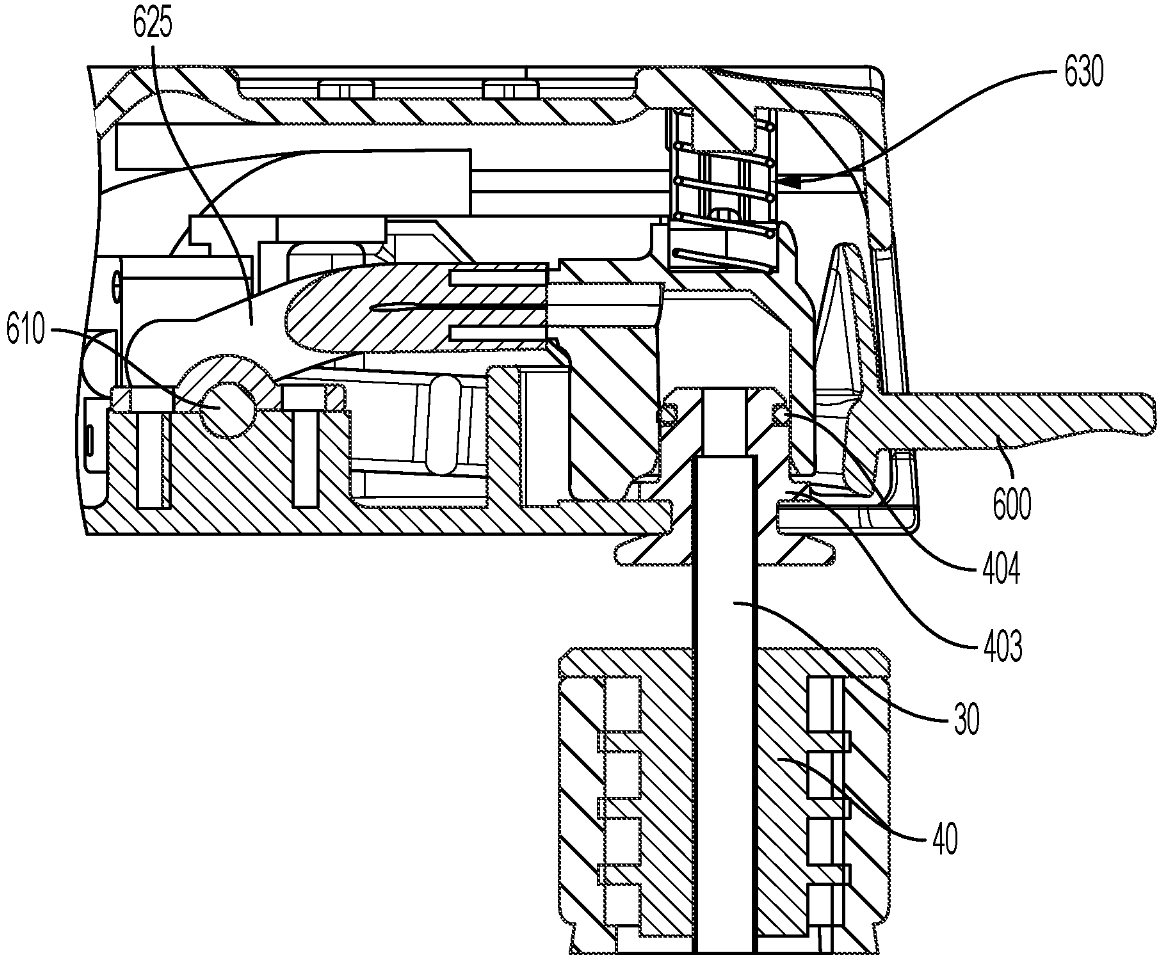
FIG. 52 illustrates a cross-sectional view of the spring loaded lever assembly.
Figure 54:
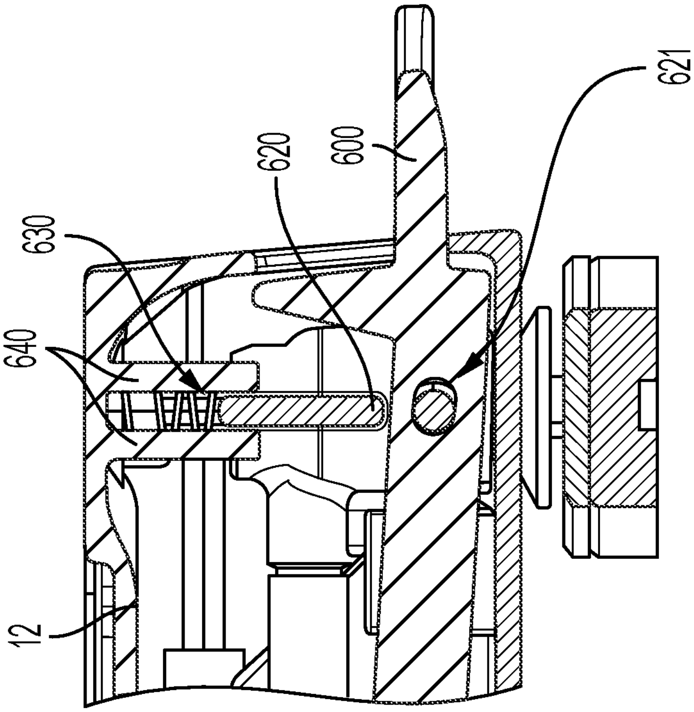
FIG. 54 illustrates a cross-sectional view of the spring loaded lever assembly.
Figure 53:
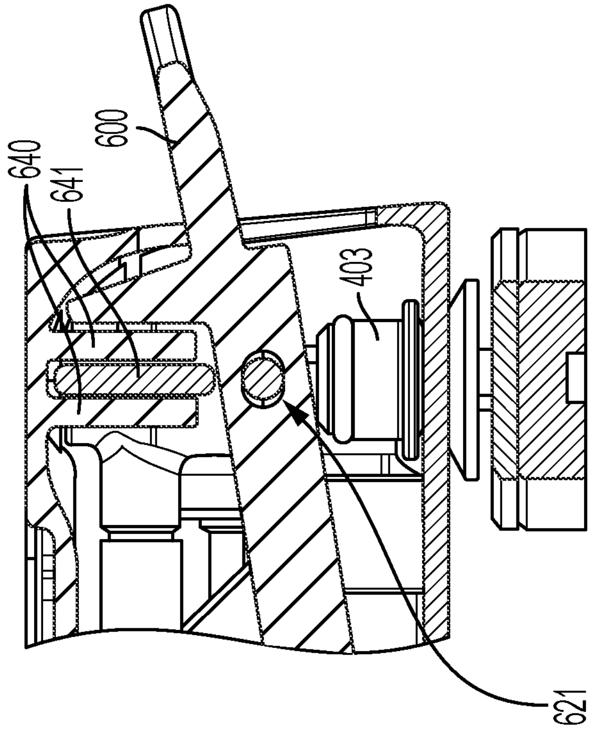
FIG. 53 illustrates a cross-sectional view of the spring loaded lever assembly.
Figure 55:
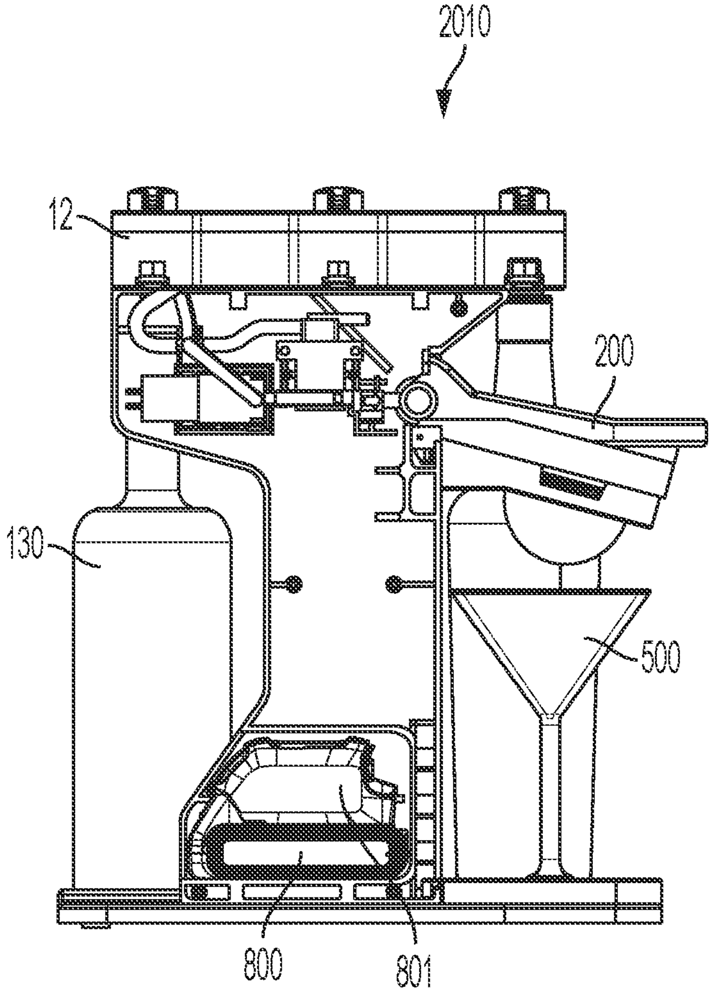
FIG. 55 illustrates a side view of an exemplary embodiment of a battery powered drink maker.

FIGS. 52-54 illustrate operation of the spring lever attachment. FIG. 52 illustrates the lever 600 in the closed position. In this position, the nozzle 403 is secured in the hood 12 and liquid from the bottle 130 can be pumped out of the bottle 130, through the rigid tube 130 into the sealing member 620 and through to the tube 625. As shown in FIG. 52, the lever 600 pivots around an axis secured by the pivot clamp 610.

FIGS. 53 and 54 illustrate two more cross-sectional views of the attachment. FIG. 53 illustrates the lever 600 in the open position in which the nozzle 403 can be inserted or removed and FIG. 54 illustrates the closed position in which the nozzle 403 is secured. FIGS. 53 and 54 further illustrate the rails 640. As shown in FIGS. 53 and 54, the rails 640 accept a projection 641 of the sealing member 620 to provide for smooth translation. The opening in the hood 12 limit how far the lever 600 moves.

FIGS. 55-61 illustrate an exemplary embodiment of a drink maker 2010 that may be powered by a battery pack 800 with an adapter 801. The battery pack 800 may be a power tool battery pack with a nominal voltage of 20 volts. The battery pack 800 may be compatible with various tools such as a drill or a saw or other products compatible with a power tool system.

Figure 56:
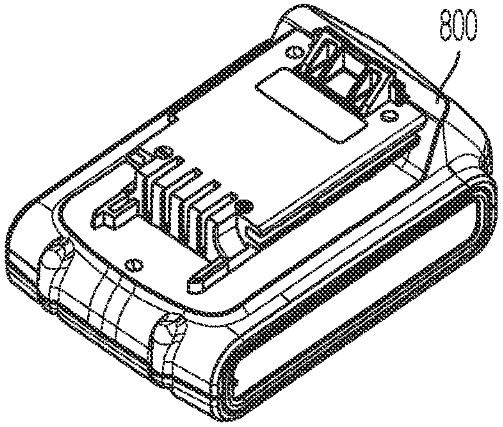
FIG. 56 illustrates a perspective view of a battery pack.
Figure 57:
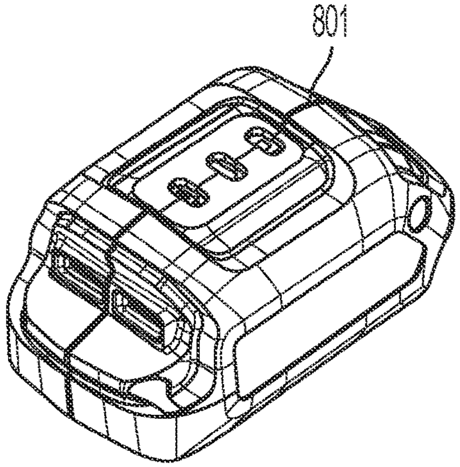
FIG. 57 illustrates a perspective view of a battery pack adapter.
Figure 58:
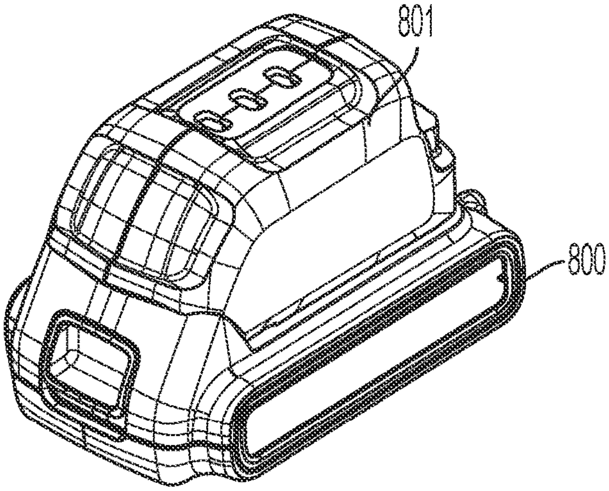
FIG. 58 illustrates a perspective view of the battery pack and adapter.
Figure 59:
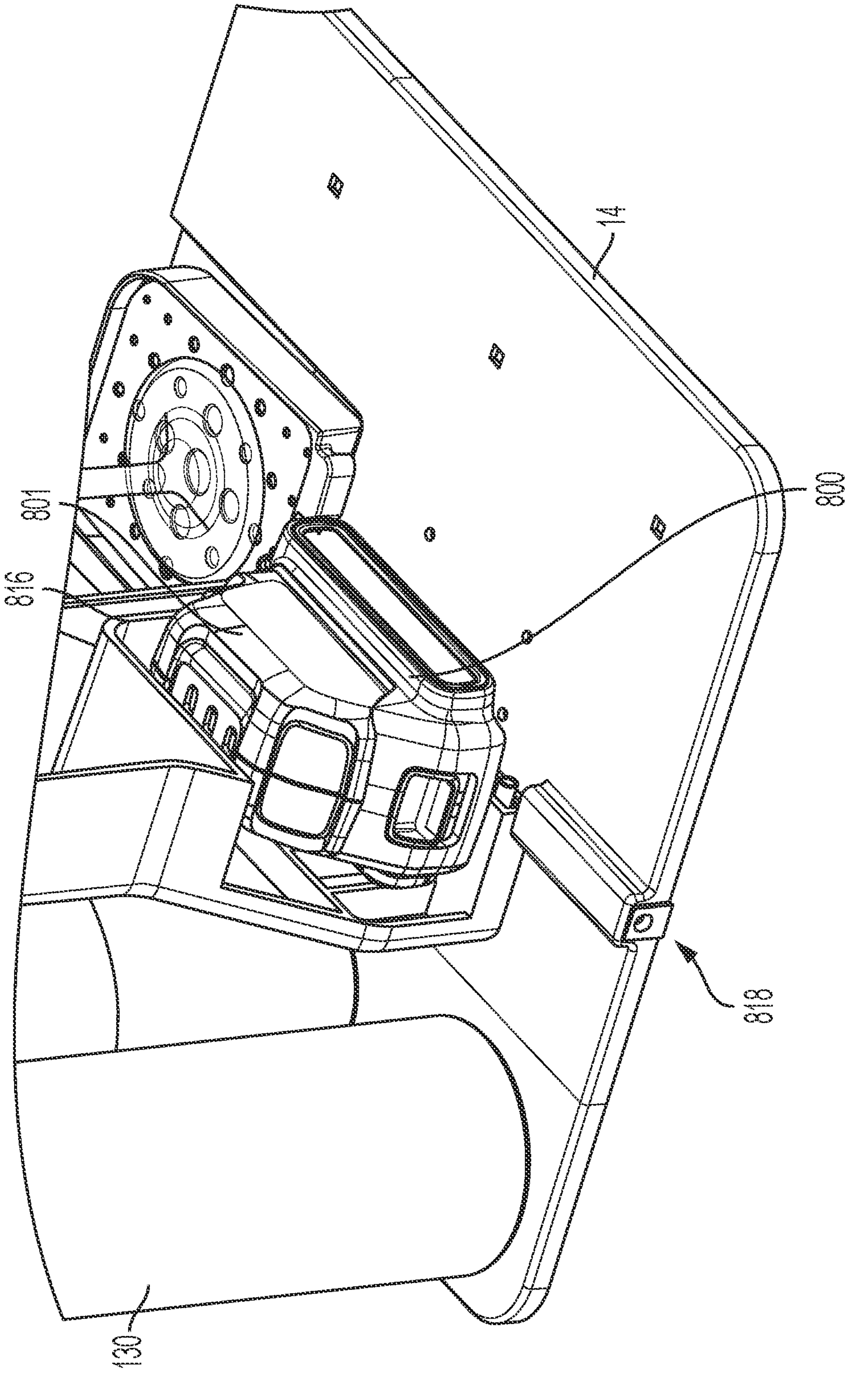
FIG. 59 illustrates a perspective view of the battery pack and adapter in a tower of the powered drink maker.
Figure 60:
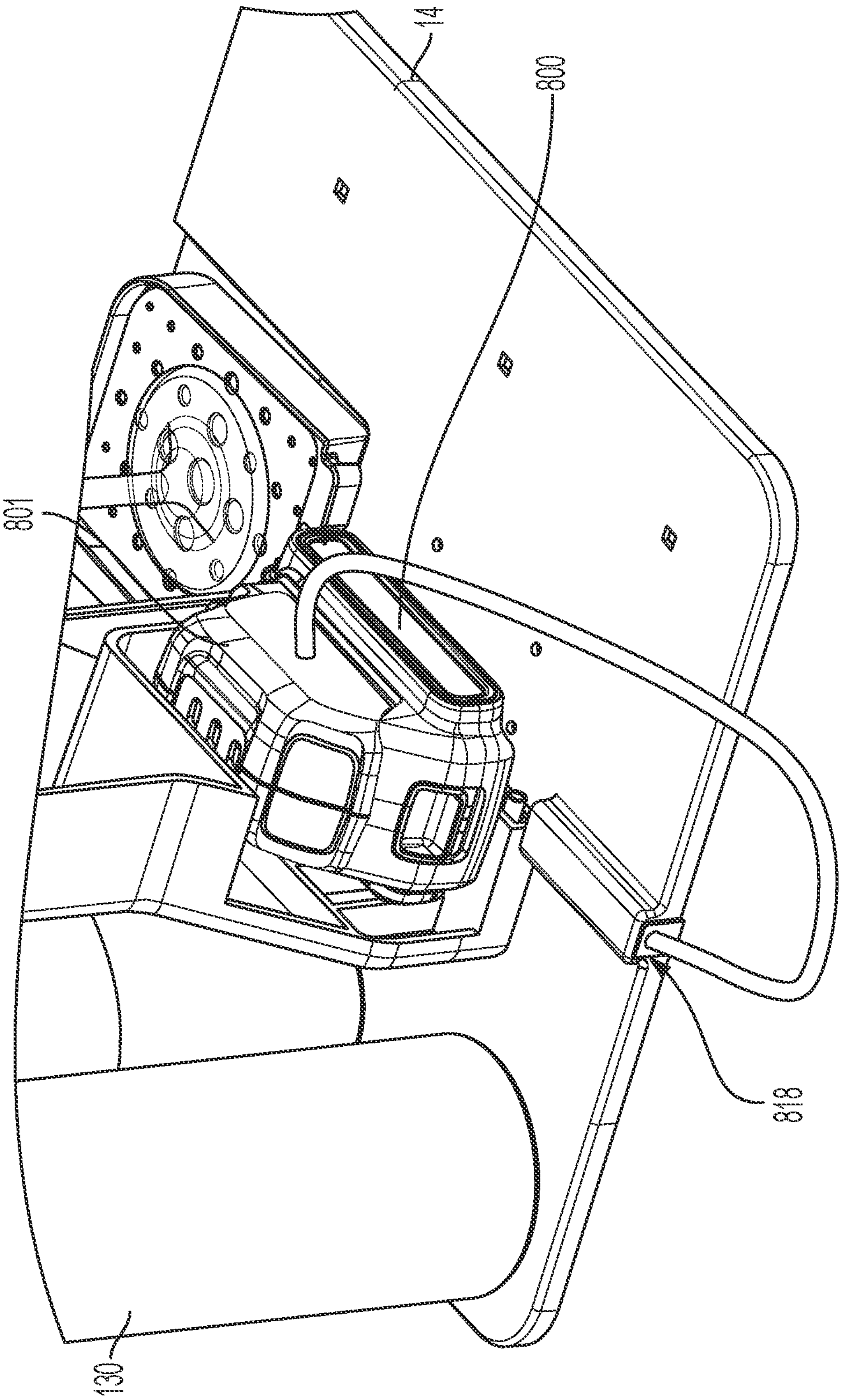
FIG. 60 illustrates another perspective view of the battery pack and adapter in a tower of the powered drink maker.
Figure 61:
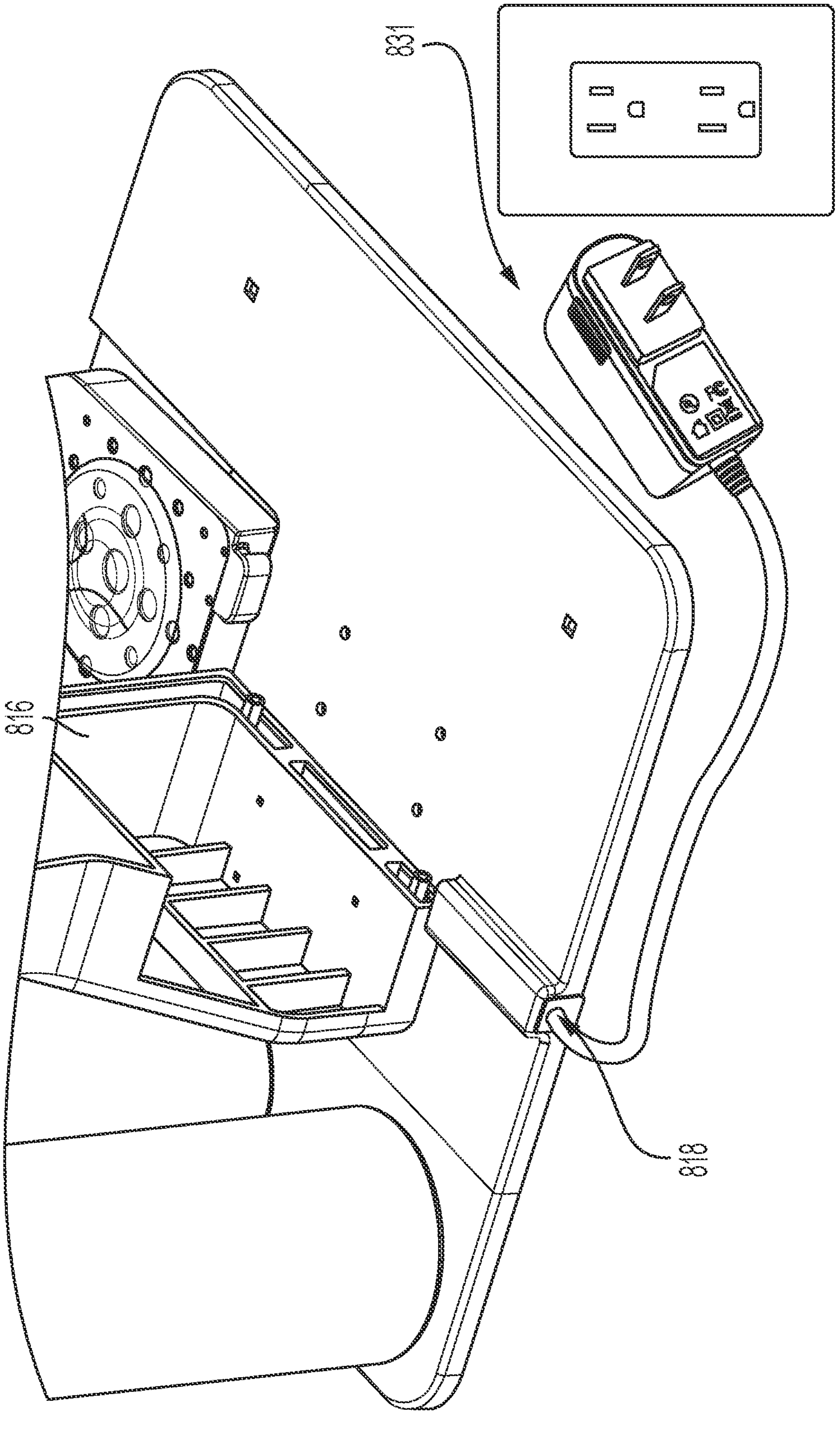
FIG. 61 illustrates a power outlet feature.

FIG. 56 is an illustration of the battery pack 800 and FIG. 57 illustrates the adapter 801. As shown in FIG. 58, the adapter 801 slides onto and electrically connects with the battery pack 800. As shown in FIG. 59, the battery pack 800 and adapter 801 can fit into a cavity 816 in the tower 16. The battery pack adapter 801 includes a DC power down converter to convert the power from the battery pack 800 to a 12V input for the drink maker 2010. As shown in FIG. 60, a power cable can be plugged into the pack adapter 801 at one end and the drink maker 2010 power input 818 at the other end to provide power to the drink maker 2010. If an outlet is available or a battery is not available, a power cable block and cord 831 may instead be plugged into a power outlet and into the power input 818 to provide power to the drink maker 2010, as shown in FIG. 61. The power block 831 can convert AC power from a wall outlet to the desired 12V DC input power.

Other power conversions are also possible. For example, the drink maker 2010 may run on AC power. In that case, the pack adapter 801 may include an inverter for converting the DC power of the battery pack 800 to an AC input for the drink maker 2010. Similarly, different input voltages may be used and the input power converted accordingly.

Figure 63:
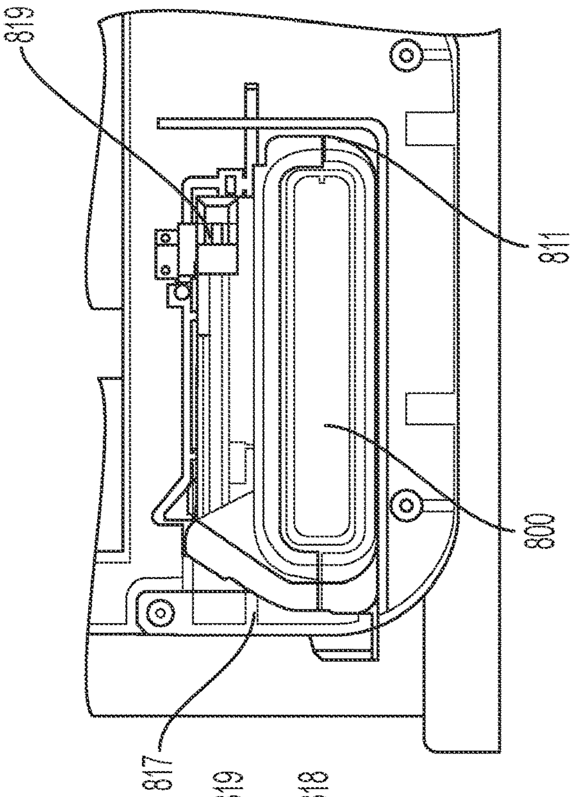
FIG. 63 illustrates a battery pack and drink maker feature.
Figure 62:
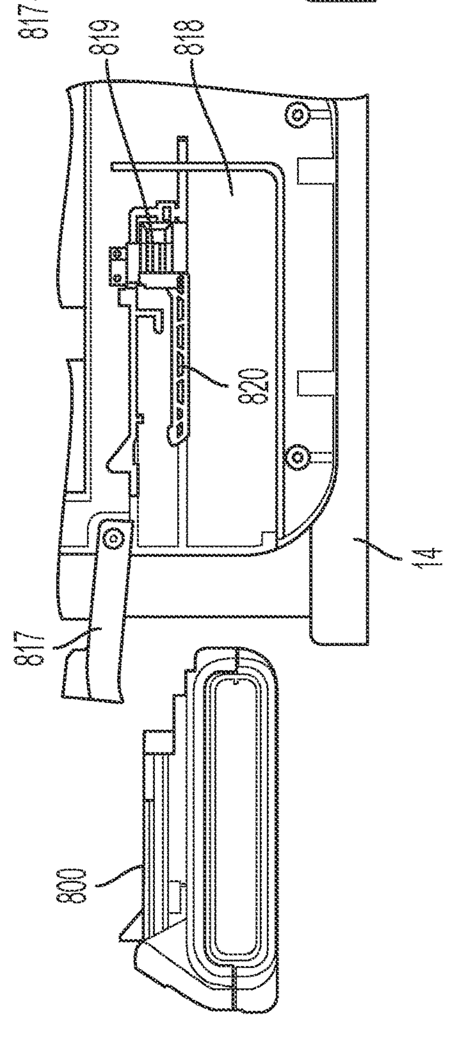
FIG. 62 illustrates a battery pack and drink maker feature.
Figure 64:
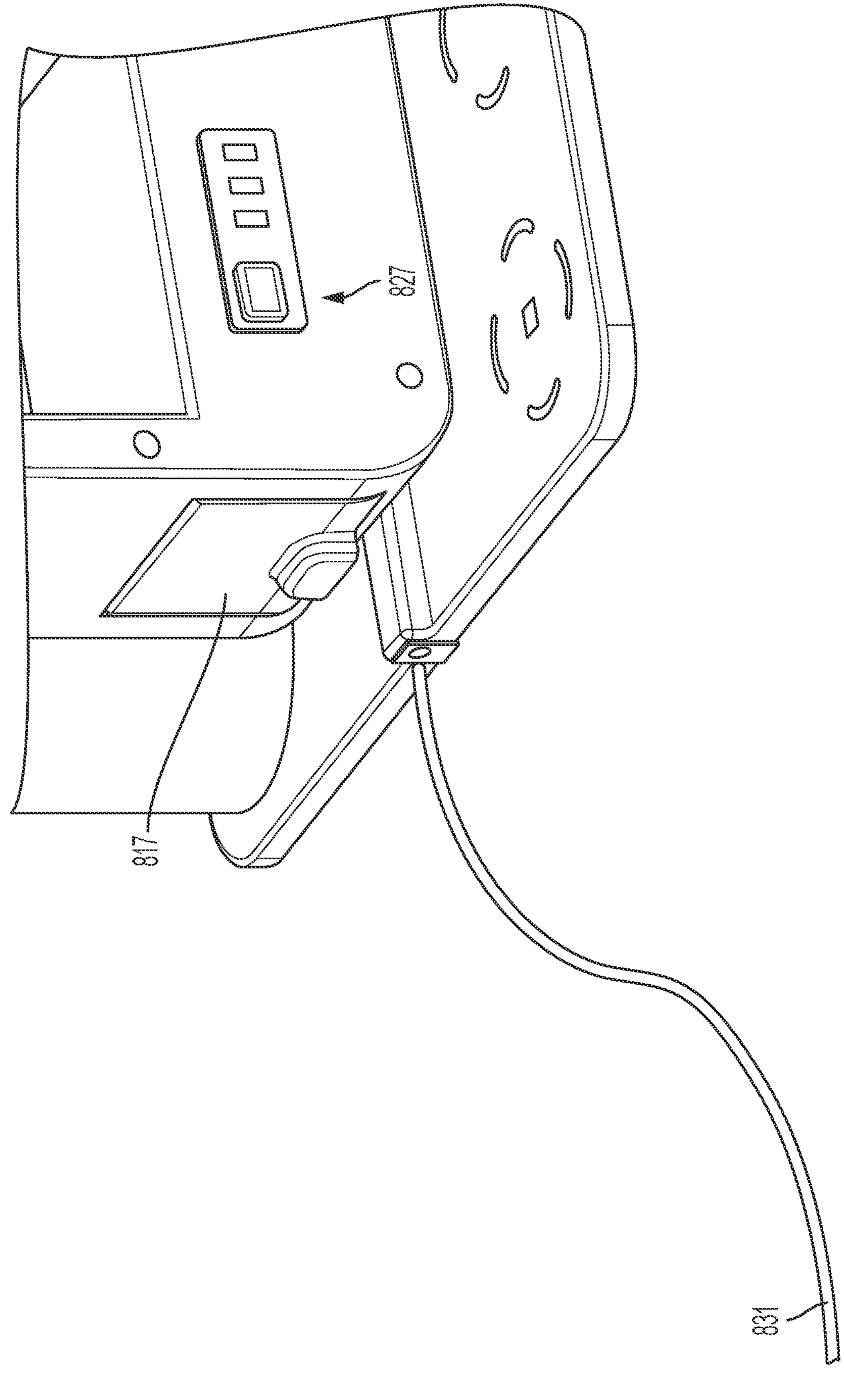
FIG. 64 illustrates a battery pack and drink maker feature.

FIG. 62-64 illustrate another exemplary embodiment of a system for powering a drink maker by a battery pack or through a power outlet. In the exemplary embodiment of FIGS. 62-64, the battery pack 800 is directly engaged with the drink maker. As shown in FIGS. 62 and 63, there is a compartment 818 with rails 820 for engaging the battery pack 800. There is also an electrical connector 819 to electrically connect to the battery pack 800. The battery pack can be slid into the compartment 818 and the door 817 can then be shut to enclose the battery pack 800. FIG. 64 illustrates the battery when it is in the compartment 818 with the door 817 shut. There is a state of charge indicator 827 to indicate a state of charge of the battery pack 800. Additionally, there is a wall plug cord 831 for charging the battery pack 800, which can be charged while it is in the compartment 818.

While the invention has been described by way of exemplary embodiments, it is understood that the words which have been used herein are words of description, rather than words of limitation. Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims.

It is to be understood that the present disclosure contemplates that, to the extent possible, one or more features of any embodiment can be combined or exchanged with one or more features of any other embodiment.

What is claimed is:

1. A drink making device, comprising:

a hood;

a base configured to support at least four bottles;

a tower connecting the base and the hood, wherein:

the hood, the tower, and the base define a volume for placing the bottles, and the volume is open to an environment of the drink making device; and a dispenser for dispensing a beverage, the dispenser connected to the tower between the base and the hood in the volume;

wherein the hood includes at least four attachment connectors; and wherein liquid from the bottles is selectively pumped through the connectors through the dispenser to dispense a beverage.

2. The drink making device of claim 1, wherein the base and attachment connectors are configured to receive bottles of different sizes.

3. The drink making device of claim 1, further comprising a pump to selectively draw liquids out of the bottles.

4. The drink making device of claim 1, wherein the hood is substantially rectangular-shaped.

5. The drink making device of claim 1, wherein the base is substantially rectangular-shaped.

6. The drink making device of claim 1, wherein the base includes at least one LED for illuminating at least one bottle.

7. The drink making device of claim 1, further comprising a controller for controlling operation of the drink making device.

8. The drink making device of claim 1, wherein the drink making device can be powered by a battery pack or through a wall outlet; and wherein the tower includes a compartment for receiving the battery pack.

9. The drink making device of claim 1, further comprising a flavor capsule;

wherein liquid from at least one of the bottles is mixed with contents of the flavor capsule to create a beverage.

10. The drink making device of claim 1, wherein the hood is substantially square-shaped and the base is substantially square-shaped.

11. The drink making device of claim 1, wherein:

the at least four bottles are arranged along two directions, and the at least four attachment connectors of the hood are arranged along the two directions.

12. A drink making device, comprising:

a base configured to support a bottle containing a liquid;

a hood;

a tower connecting the base and the hood, wherein:

the hood, the tower, and the base define a volume for placing the bottle, and the volume is open to an environment of the drink making device;

a dispenser for dispensing a beverage, the dispenser connected to the tower between the base and the hood in the volume;

a connector disposed in the hood and configured to receive liquid from the bottle, wherein the connector is operative without a pressurized gas supply;

a rigid connector that extends into the bottle and engages with the connector.

13. The drink making device of claim 12, wherein the connector is rotatable from an open position and a closed position.

14. The drink making device of claim 12, wherein the connector is configured such that it can receive different lengths of the rigid connector to operatively connect the bottle to the hood.

15. The drink making device of claim 12, further comprising a bottle sealing grommet which seals the bottle and a rigid tube; and wherein the rigid tube projects into the bottle sealing grommet.

16. The drink making device of claim 12, wherein:

the base is configured to support at least four bottles arranged along two directions, the at least four bottles comprising the bottle containing the liquid, the drink making device comprises at least four connectors disposed in the hood and arranged along the two directions, the at least four connectors comprising the connector.

* * * * *